(12) United States Patent
Chigusa et al.

(10) Patent No.: US 7,752,216 B2
(45) Date of Patent: Jul. 6, 2010

(54) RETRIEVAL APPARATUS, RETRIEVAL METHOD AND RETRIEVAL PROGRAM

(75) Inventors: Kentaro Chigusa, Tokyo (JP);
Tadataka Matsubayashi, Machida (JP);
Kazutomo Ushijima, Fuchu (JP);
Tsuyoshi Sudo, Ichikawa (JP)

(73) Assignee: Hitachi, Ltd., Tokyo (JP)

( * ) Notice: Subject to any disclaimer, the term of this patent is extended or adjusted under 35 U.S.C. 154(b) by 522 days.

(21) Appl. No.: 11/788,478

(22) Filed: Apr. 20, 2007

(65) Prior Publication Data

US 2008/0154882 A1 Jun. 26, 2008

(30) Foreign Application Priority Data

Dec. 21, 2006 (JP) .............................. 2006-344819

(51) Int. Cl.
G06F 7/00 (2006.01)
G06F 17/13 (2006.01)
(52) U.S. Cl. ........................ 707/758; 707/770; 707/781
(58) Field of Classification Search ...................... 707/5
See application file for complete search history.

(56) References Cited

U.S. PATENT DOCUMENTS

| 5,920,854 | A  | * | 7/1999 | Kirsch et al. ............ 707/3 |
| 6,098,064 | A  | * | 8/2000 | Pirolli et al. ............ 707/2 |
| 6,581,055 | B1 | * | 6/2003 | Ziauddin et al. ......... 707/4 |
| 7,171,619 | B1 | * | 1/2007 | Bianco ................. 715/206 |
| 7,188,101 | B2 | * | 3/2007 | Smyth ................... 707/3 |
| 7,574,419 | B2 | * | 8/2009 | Krishnaswamy et al. ..... 707/1 |
| 2002/0078133 | A1 | * | 6/2002 | Nagano et al. .......... 709/201 |
| 2002/0164053 | A1 | * | 11/2002 | Seder et al. ............ 382/100 |
| 2004/0006555 | A1 | * | 1/2004 | Yamamoto et al. ........ 707/1 |

FOREIGN PATENT DOCUMENTS

| JP | 01-259418 A | 10/1989 |
| JP | 08-194718 | 7/1996 |
| JP | 2003-308335 | 10/2003 |
| JP | 02005165891 | * 6/2005 |

OTHER PUBLICATIONS

Atsushi et al. "Development of a Software Full-text Search Machine," Information Processing Society of Japan Research Report 92:19-25 (May 12, 1992).
Japan Patent Office (JPO) office action for JPO patent application JP2006-344819 (Dec. 3, 2008).
William B. Frakes and Ricardo Baeza-Yates, "Information Retrieval", Prentice Hall PTR, Inc., pp. 219-240, 1992.

* cited by examiner

Primary Examiner—Kuen S Lu
Assistant Examiner—Binh V Ho
(74) Attorney, Agent, or Firm—Townsend and Townsend and Crew LLP

(57) ABSTRACT

A retrieval apparatus 100 for searching document data comprises a document storage area 141 for storing documents to be searched and a document management table 142 for storing a data size of a document such that the data size is associated with a document ID for identifying the document. The retrieval apparatus 100 reads out from the document management table data sizes of documents to be searched, and calculates a retrieval document size by adding up the read out data sizes, and calculates an estimated time t1 taken for a retrieval process by the index scan method and an estimated time t2 taken for the retrieval process by the text scan method, based on the retrieval document size. The retrieval apparatus 100 compares the estimated times t1 and t2, and decides which method to use for a retrieval process, the index scan method or the text scan method.

12 Claims, 36 Drawing Sheets

DOCUMENT MANAGEMENT TABLE

| DOCUMENT ID | SIZE | OFFSET |
|---|---|---|
| 1 | 10240 | 0 |
| 2 | 20480 | 10240 |
| 3 | 15446 | 30720 |
| : | : | : |
| 321 | 5000 | 6540000 |

INDEX STORAGE AREA

INDEX MANAGEMENT TABLE

151

| CHARACTER | SIZE |
|---|---|
| : | : |
| ア | 1536 |
| : | : |
| 教 | 2560 |
| : | : |
| 育 | 1740 |

1511 — CHARACTER column
1512 — SIZE column

FIG. 6

KEYWORD STORAGE AREA   140

| | |
|---|---|
| 1401 | 教育 |
| 1402 | ストリーミング |
| 1403 | コミュニケーション |
| 1404 | e-ラーニング |

FIG. 7

QUERY STORAGE AREA 143

| CHARACTER | INDEX SIZE | CONTINUOUS CHARACTER CHECK FLAG |
|---|---|---|
| 教 | 2568 | 0 |
| 育 | 1748 | 1 |
| ス | 1536 | 0 |
| ト | 1024 | 1 |
| ... | ... | ... |
| グ | 2856 | 1 |

SETTING INFORMATION STORAGE AREA 147

| MEMORY ACCESS SPEED (MB/sec) | 100 |
|---|---|
| DISK ACCESS SPEED (MB/sec) | 30 |

FIG. 9

INDEX STORAGE AREA

| WORD | DOCUMENT ID | OCCURRENCE POSITION |
|---|---|---|
| enterprise | 1 | 10 |
| enterprise | 1 | 235 |
| enterprise | 6 | 1520 |
| ⋮ | ⋮ | ⋮ |
| enterprise | 100 | 4 |
| enterprise | 100 | 50 |
| ⋮ | ⋮ | ⋮ |
| enterprise | 322 | 18 |
| information | 2 | 10 |
| information | 2 | 10 |
| information | 6 | 10 |
| ⋮ | ⋮ | ⋮ |
| information | 100 | 5 |
| information | 100 | 51 |
| ⋮ | ⋮ | ⋮ |
| information | 322 | 19 |

FIG. 22

INDEX MANAGEMENT TABLE

| WORD | SIZE |
|---|---|
| : | : |
| absolute | 1536 |
| : | : |
| enterprise | 2560 |
| : | : |
| information | 1740 |

FIG. 23

BUFFER MANAGEMENT TABLE

| DOCUMENT ID |
|---|
| 48 |
| 106 |
| : |
| 322 |
| : |

RETRIEVAL APPARATUS, RETRIEVAL METHOD AND RETRIEVAL PROGRAM

This application relates to and claims priority from Japanese Patent Application No. 2006-344819 filed on Dec. 21, 2006, the entire disclosure of which is incorporated herein by reference.

BACKGROUND

Recently, owing to widespread use of computers in various works, it has been getting easier to create electronic documents, and the number and volume of documents stored in storage devices such as memories or hard disk drives have been significantly increasing.

Under such circumstances, a user cannot access his/her desired document if he/she does not know the name of the document or has forgotten it. It is hard and difficult for a user to examine all of a great number of documents to find which the desired one is.

Therefore, searching throughout a storage device for a document including a search key, i.e., full text search is conveniently utilized. Examples of searching methods used in full text search include the text scan method, which means scanning sequentially target documents to check whether each of them contains a search key (as described in, for example, page 219 to page 240 in "Information Retrieval" edited by William B. Frakes and Ricardo Baeza-Yates, published by Prentice Hall PTR, Inc. in 1992), and the index scan method using an index in which, for each search key, a document containing the search key is registered (as disclosed in, for example, Japanese Patent Application Laid-open Publication No. Hei 08-194718).

Meanwhile, as a technique for selecting a search engine, for example, there is the disclosure of Japanese Patent Application Laid-open Publication No. 2003-308335.

SUMMARY

When a full text search is performed, it is desirable to estimate the time taken for the search in the case of using the text scan method and the time in the case of using the index scan method, and carry out the search by the method whose estimated time is less.

However, the total of the data sizes of documents to be searched is required for calculating an estimated time taken for a search, and it would take a long time to retrieve the data sizes of the documents from the storage device, especially when a large number of documents are stored therein.

In order to provide a solution to the foregoing and other problems, one aspect of the present disclosure is a retrieval apparatus for searching document data to retrieve desired data, comprising a document storage unit for storing document data to be searched, a document size storage unit for storing a data size of the document data such that the data size is associated with a document ID for identifying the document data, a retrieval document size calculation unit for reading out from the document size storage unit the data size associated with the document ID indicating the document data to be searched, and calculating a retrieval document size by adding up the read out data sizes, a prospect time calculation unit for calculating a first estimated time taken for a retrieval process by a first retrieval method and a second estimated time taken for the retrieval process by a second retrieval method, based on the retrieval document size, and a retrieval method decision unit for comparing the first and second estimated times and deciding which retrieval method to use for performing the retrieval process, the first method or the second method.

BRIEF DESCRIPTION OF THE DRAWINGS

FIG. 6 shows an illustrative structure of an index management table 151;

FIG. 7 illustrates an keyword storage area 140 with keywords stored therein;

FIG. 8 shows an illustrative structure of a query storage area 143;

FIG. 9 shows an illustrative structure of a setting information storage area 147;

FIG. 22 shows an illustrative structure of the index storage area 150 in an embodiment wherein word-based indices are generated;

FIG. 23 shows an illustrative structure of the index management table 151 in the embodiment wherein word-based indices are generated;

DESCRIPTION OF EMBODIMENTS

Figure 1:
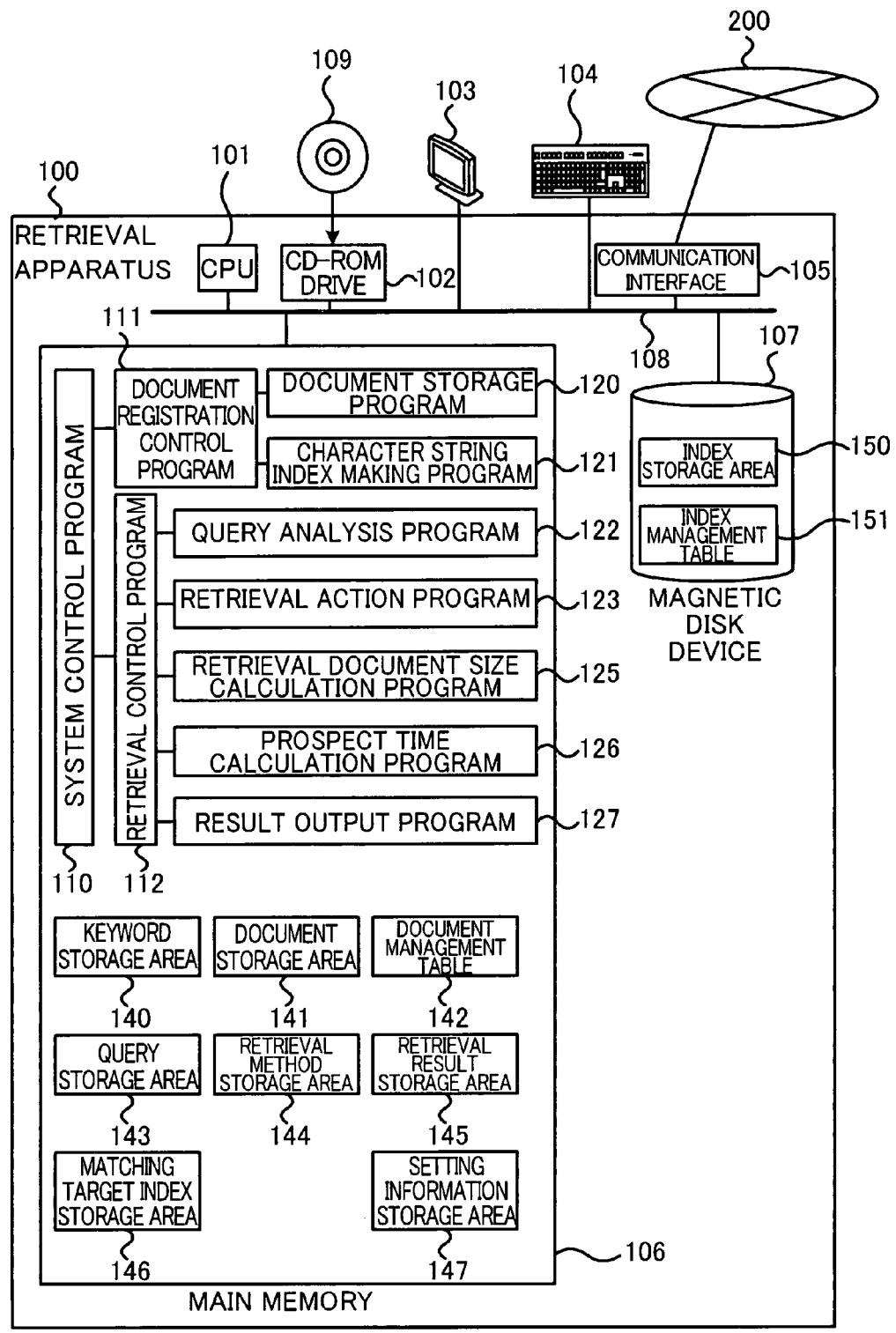
FIG. 1 is an illustrative hardware block diagram of a retrieval apparatus 100 with regards to the present embodiment.

In an illustrative embodiment of the present disclosure, a retrieval apparatus 100 performs a retrieval of a document containing a keyword provided by a user, a so-called full text search. Documents to be searched are placed under the management of the apparatus 100 as, for example, a file stored in a file system or a record stored in a database.

When the text scan method is adopted as a document retrieval method used in a full text search of documents, all of the documents are checked sequentially to find whether they contain a word or the like matching a keyword. Therefore, a search time taken for a search of documents by the text scan method (this search is hereinafter referred to as "text search") is proportional to the total of the data sizes of all of documents to be searched (hereinafter referred to as "target documents"). That means, when the number of target documents or the data size thereof is large, a long time is required for retrieving a desired document.

For example, let's assume that there are 400 thousands target documents with an average data size of 200 kilobytes per document, making the total data size 80 gigabytes (80,000 megabytes), and they are stored in a storage device from which data of 100 megabytes can be read out per second. In this case, when retrieving the document(s) containing a keyword of one character, the time required for checking the contents of the target documents against the character by the text scan method is calculated as 80,000 [megabytes]÷100 [MB/sec]=800 [seconds]. However, the acceptable range of a time taken for a retrieval process is usually around from several seconds to several tens seconds, thus it is impractical to take as much as 800 seconds as a retrieval time.

On the other hand, in the present embodiment, indices are generated in advance by the so-called N-gram method (1-gram method) so that, for each of characters contained in documents, information indicating the document containing that character and the position where that character occurs within the document (offset) are stored such that these items are associated with each other. Utilizing thus generated indices, the apparatus 100 performs a search of documents by the index scan method (this search is hereinafter referred to as "index search").

However, the number of indices tends to be enormous when the indices are generated by the N-gram method as in the case of the retrieval apparatus 100 in the present embodiment, and there are some instances when the time taken for reading out all documents may be shorter than the time for reading out indices, depending on the number of target documents.

Therefore, the retrieval apparatus 100 in the present embodiment, each time it finishes an index search regarding one of characters constituting a keyword specified by a user (such a character corresponds to a retrieval key), compares the estimated time that it will take to perform the text search of the current target documents, which are narrowed down by the previous index search, with the estimated time that it will take to perform the further index search regarding the remaining characters. If the time for the text search of the narrowed-down target documents is shorter, the apparatus 100 switches the retrieval method to the text search for the rest of the retrieval process.

FIG. 1 is a hardware block diagram of the retrieval apparatus 100 with regards to the present embodiment. As shown in FIG. 1, the retrieval apparatus 100 in the present embodiment comprises a CPU 101, a CD-ROM drive 102, a display device 103, a keyboard 104, a communication interface 105, a main memory 106, a magnetic disc device 107, and a bus 108 connecting them.

A CD-ROM 109 stores programs and data. In some embodiments, the CD-ROM 109 maybe replaced with another type of portable storage media, such as a DVD-ROM, a MO disk, a floppy disk, a flash memory, a hard disk, or the like.

The CD-ROM drive 102 reads out the programs and the data stored in the CD-ROM 109. After being read out from the CD-ROM drive 102,the programs and the data are stored in the main memory 106, and maybe transferred to the magnetic disc device 107 through the bus 108. In some embodiments, the CD-ROM drive 102 may be replaced with a DVD drive, a MO drive, a floppy disk drive (FDD) or the like, depending on a storage media storing the programs and the data.

The communication interface 105 is an interface for connecting to a communication network 200. The communication network 200 may be in the form of, for example, the Internet, a LAN (Local Area Network), or a SAN (Storage Area Network). The communication interface 105 may be in the form of, for example, an adapter for connecting to an Ethernet (registered trademark), an adapter for connecting to a fiber channel, or a modem for connecting to a public telephone network.

The main memory 106 stores a system control program 110. The system control program 110 is launched in response to a command inputted through the keyboard 104. In some embodiments, as a command to launch the system control program 110, a command sent from another computer (not shown) connected to the network 200 through the communication interface 105 may be also received.

The system control program 110 comprises a document registration control program 111 and a retrieval control program 112. The document registration control program 111, in turn, comprises a document storage program 120 and a character string index making program 121.

The retrieval control program 112 comprises a query analysis program 122, a retrieval action program 123, a retrieval document size calculation program 125, a prospect time calculation program 126, and a result output program 127.

The above-mentioned programs are stored in the CD-ROM 109, and are read out to the main memory 106 by the CD-ROM drive 102. In some embodiments, these programs may be stored in the magnetic disk device 107, or may be received through the communication interface 105 from another computer (not shown) connected to the communication network 200. In other embodiments, these programs may be entered through the keyboard 104.

In the present embodiment, the functions of the retrieval apparatus 100 are realized by the CPU 101 executing the programs 110 to 127 shown in FIG. 1. However, it should be appreciated that they may be realized by means of hardware, for example, by employing integrated circuit components configured to carry out the functions, such as a system control component, a document registration control component, a document storage component, an index making component, a retrieval control component, a query analysis component, an index scan component, a text scan component, an index scan search time estimation component, a text scan search time estimation component, and a retrieval result output component.

In the following description, for the sake of brevity, the functional units realized by the CPU 101 executing the programs 110 to 127 are treated as actors of processing. In the embodiments where the functional units are realized in hardware, these functional units serve as actors of processing.

In addition, in the main memory 106, there are reserved storage areas of a keyword storage area 140, a document storage area 141, a document management table 142, a query storage area 143, a retrieval method storage area 144, a retrieval result storage area 145, a matching target index storage area 146, and a setting information storage area 147. In some embodiments, these storage areas may be reserved in the magnetic disk device 107.

The magnetic disk device 107 is a secondary storage device to store data. The magnetic disk device 107 may be, for example, a hard disk drive. In the magnetic disk device 107, storage areas of an index storage area 150 and an index management table 151 are reserved. In some embodiments, the magnetic disk device 107 may be in the form of a NAS (Network Attached Storage) connected to the communication network 200, and be connected to the retrieval apparatus 100 through the communication interface 105. In other embodiments, the magnetic disk device 107 maybe built into another computer (not shown) connected to the communication network 200 through its communication interface.

The magnetic disk device 107 stores the index management table 151, as will be described later. In some embodiments, the index storage area 150 may be reserved in the main memory 106. Likewise, the index management table 151 may be stored in the main memory 106.

Figure 2:
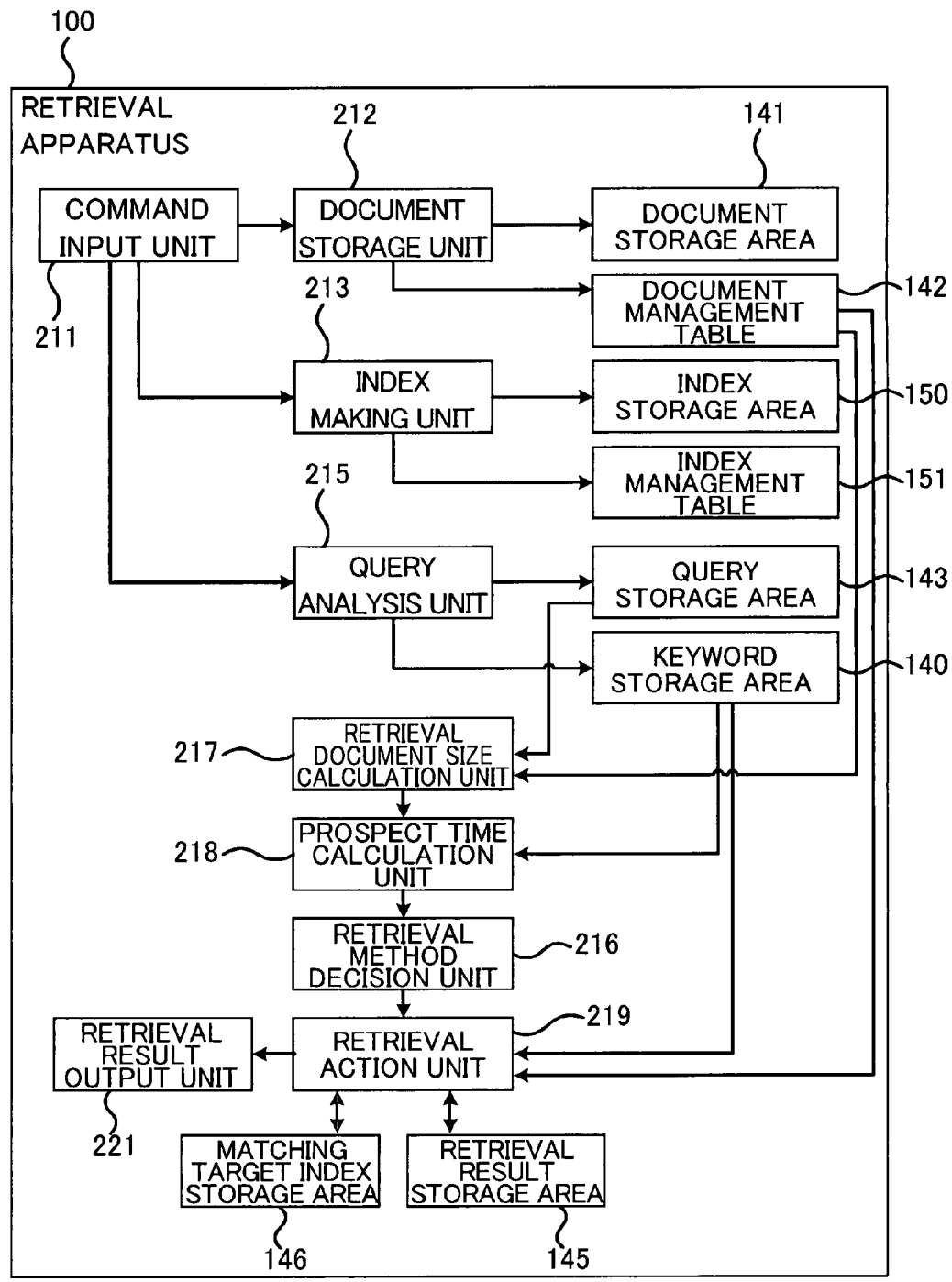
FIG. 2 is an illustrative software block diagram of the retrieval apparatus 100.

FIG. 2 is a software block diagram of the retrieval apparatus 100. As shown in FIG. 2, the retrieval apparatus 100 includes a command input unit 211, a document storage unit 212, an index making unit 213, a query analysis unit 215, a retrieval method decision unit 216, a retrieval document size calculation unit 217, a prospect time calculation unit 218, a retrieval action unit 219, and a retrieval result output unit 221.

The command input unit 211 receives an input of a command for instructing to register a document (hereinafter referred to as "registration command") or a command for instructing to retrieve a document (hereinafter referred to as "retrieval command"). The command input unit 211 receives a command input through the keyboard 104. The command input unit 211 is realized by the CPU 101 executing the system control program 110.

In the present embodiment, a registration command is assumed to include data indicating the content of a document to be registered. For example, the content of the document may be stored as a file in the magnetic disk device 107 in advance, and the name of that file may be included in the registration command.

In the present embodiment, a retrieval command is assumed to include a retrieval criterion. A retrieval criterion included in a retrieval command comprises one or more keywords. In the present embodiment, for brevity of description, it is assumed that a document retrieval is performed so as to retrieve a document containing all of such keywords, that is, a so-called "AND" operator search is performed.

Figures 3, 4:
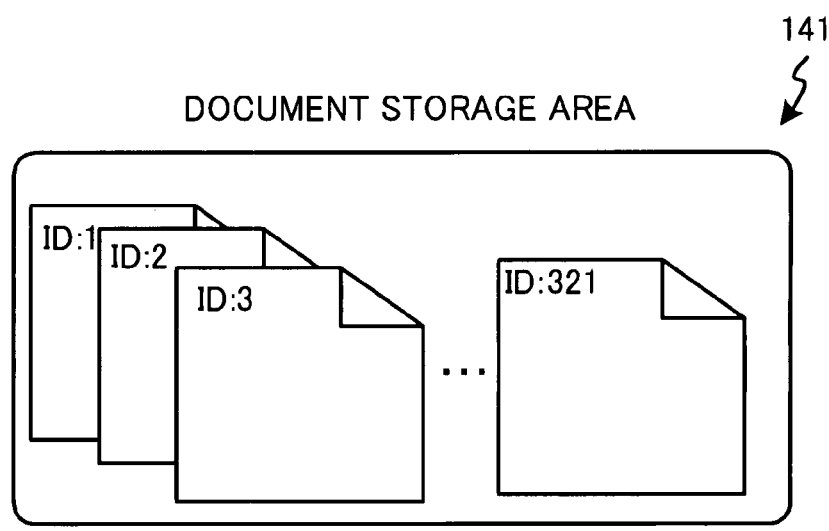
FIG. 3 shows an illustrative structure of a document storage area 141.
FIG. 4 shows an illustrative structure of a document management table 142.

The document storage unit 212 stores in the document storage area 141 a document indicated in a registration command. FIG. 3 shows an illustrative structure of the document storage area 141. As shown in FIG. 3, documents are stored in the document storage area 141, and each of them is given individual identification information of document (hereinafter referred to as "document ID").

Moreover, the document storage unit 212 registers in the document management table 142 (corresponding to "a document size storage unit") the data size of the document stored in the document storage area 141 and the address where the document is stored. FIG. 4 shows an illustrative structure of the document management table 142. As shown in FIG. 4, the document management table 142 stores a size 1412 and an offset 1413 such that these items are associated with a document ID 1411 therein. The size 1412 is a data size of a document, and the offset 1413 is an offset from the first address of the document storage area 141 indicating the address where the document is stored.

The retrieval document size calculation unit 217 calculates a total data amount of documents to be searched for a document retrieval (such a total data amount is hereinafter referred to as "retrieval document size"). The retrieval document size calculation unit 217 calculates a retrieval document size by reading out from the document management table 142 the sizes 1412 associated with the document IDs indicating target documents and adding up them. The process of calculating a retrieval document size will be described later on.

Figure 5:
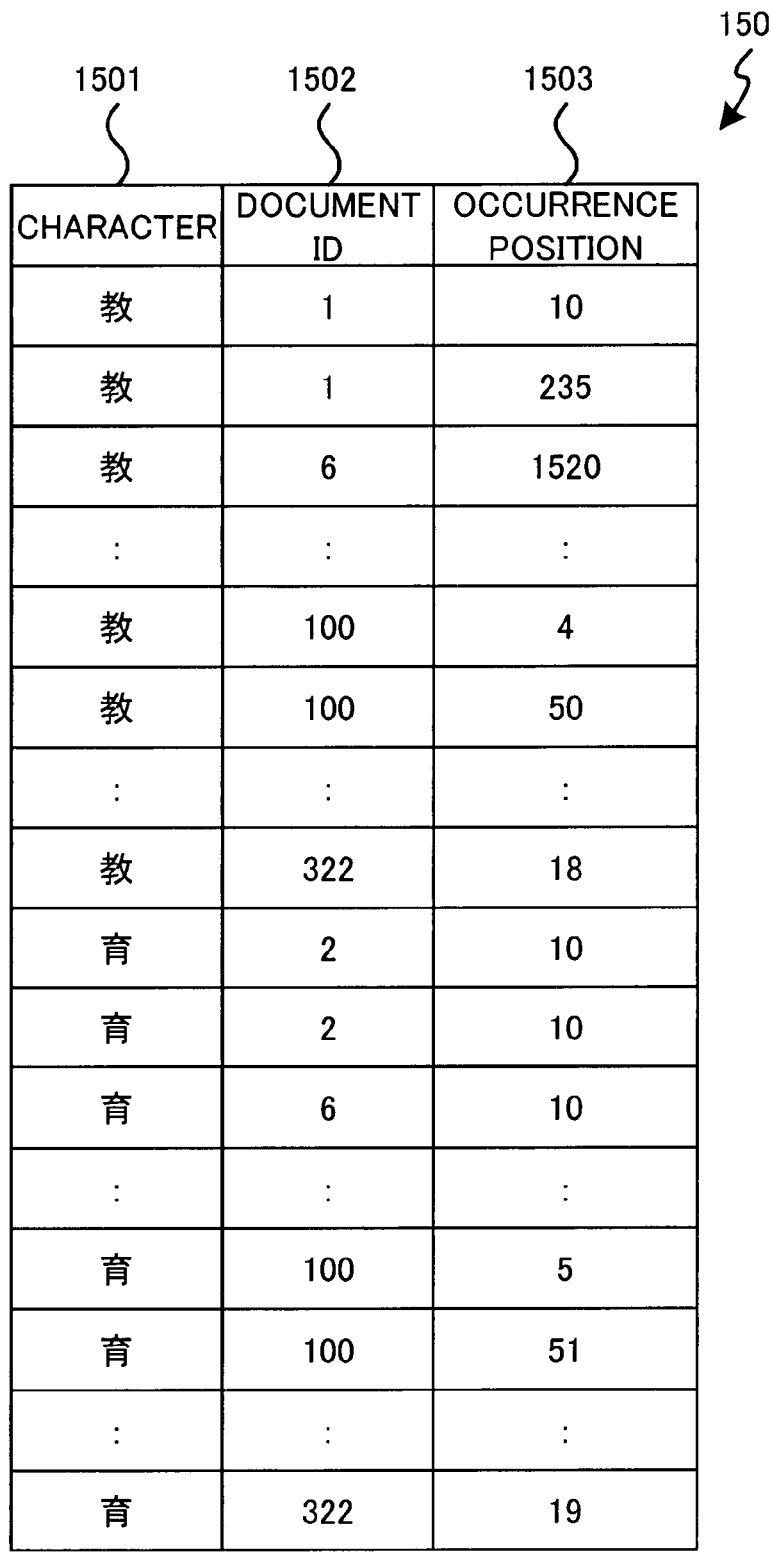
FIG. 5 shows an illustrative structure of indices stored in an index storage area.

Indices are set to a document stored in the document storage area 141. The indices of a document are stored in the index storage area 150. FIG. 5 shows an illustrative structure of the indices stored in the index storage area 150. As shown in FIG. 5, the index storage area 150 stores information including a document ID 1502, which indicates the document containing a character 1501, and an occurrence position 1503, which indicates where the character 1501 occurs within the document indicated by the document ID 1502 (this information is hereinafter referred to as "index information") such that this information is associated with the character 1501 therein. In the present embodiment, the indices are generated by the so-called 1-gram method. Thus, for each of all characters 1501 occurring in a document, the above-mentioned index information is stored in the index storage area 150.

The index management table 151 stores, for each character, a total data size of all of index information associated with the character stored in the index storage area 150. FIG. 6 shows an illustrative structure of the index management table 151. As shown in FIG. 6, the index management table 151 stores a size 1512 which is a total data size of all of index information related to a character 1511 such that the size 1512 is associated with the character 1511 therein.

The index making unit 213 updates the indices based on a document which the document storage unit 212 registers in the document storage area 141. The index making unit 213 is realized by the CPU 101 executing the character string index making program 121. The process of updating the indices will be described in detail later on.

The query analysis unit 215 analyzes a retrieval criterion included in a retrieval command. The query analysis unit 215 extracts all of keywords included in a retrieval criterion, and stores the extracted keywords in the keyword storage area 140. FIG. 7 shows the keyword storage area 140 with keywords stored therein. In the example shown in FIG. 7, four keywords 1401 to 1404 (reference numerals 1401, 1402, 1403 and 1404 respectively represent "教育", "ストリーミング", "コミュニケーション" and "e‐ラーニング") are stored in the keyword storage area 140. As will be described later, when the retrieval criterion "教育 and ストリーミングand コミュニケーションand e‐ラーニング" is specified in a retrieval command, the four keywords coupled by the "and" operator, "教育", "ストリーミング", "コミュニケーション" and "e‐ラーニング" are registered in the keyword storage area 140.

Moreover, the query analysis unit 215 generates a character string by concatenating all keywords extracted, and obtains from the index management table 151 the index information size 1512 associated with each of the characters included in the generated character string, and stores the character and the obtained size into the query storage area 143 such that the character and the size are associated with each other therein. FIG. 8 shows an illustrative structure of the query storage area 143. As shown in FIG. 8, the query storage area 143 stores an index size 1432 and a continuous character check flag 1433 such that these items are associated with each of characters 1431 constituting a character string generated by concatenating keywords. The index size 1432 is a total data size of all index information associated with a character. The continuous character check flag 1433 is a flag value indicating whether a character is the first character of any keyword, or the second or larger. For the first character of each keyword, "0" is set in this flag. Otherwise, "1" is set therein. Furthermore, a pointer 1434 pointing to the character 1431 is stored in the query storage area 143. For example, the address in the main memory 106 where the character 1431 is stored may be set to the pointer 1434.

The prospect time calculation unit 218 calculates estimated times taken for searching documents, that is, a t1 which is an estimated time for an index search and a t2 which is an estimated time for a text search. Data required to calculate such an estimated time t1, for example, an amount of data which can be read out from the main memory 106 per unit time (hereinafter referred to as "memory access speed") and an amount of data which can be read out from the magnetic disk device 107 per unit time (hereinafter referred to as "disk access speed"), are assumed to be stored in advance in the setting information storage area 147 as shown in FIG. 9. The prospect time calculation unit 218 is realized by the CPU 101 executing a prospect time calculation program 126 stored in the main memory 106.

The retrieval method decision unit 216 decides a retrieval method based on estimated times t1 and t2. As will be described later, when the t1 becomes longer than the t2 in progress of a document retrieval process by the index scan method, the retrieval method decision unit 216 decides to perform the rest of the retrieval process by the text scan method. The retrieval method decision unit 216 is realized by the CPU 101 executing the retrieval control program 112 stored in the main memory 106.

Figure 10:
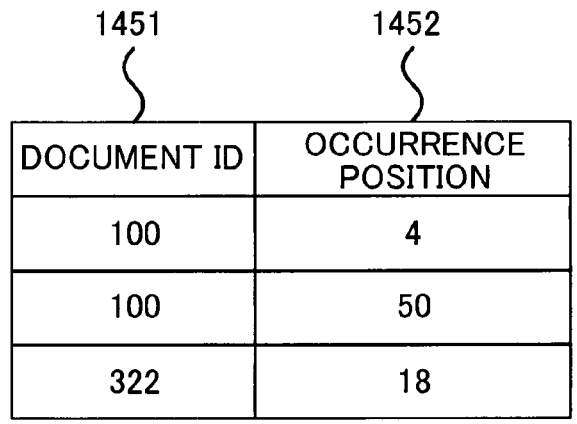
FIG. 10 shows an illustrative structure of a retrieval result storage area 145.
Figure 11:
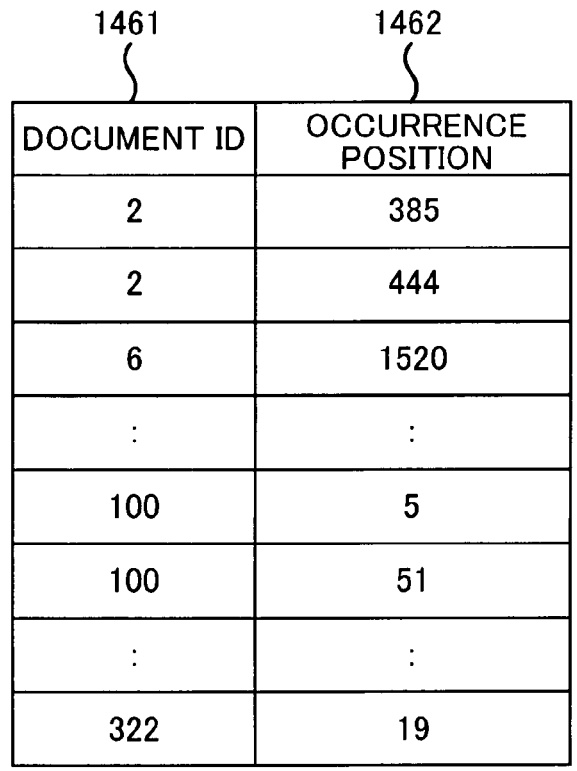
FIG. 11 shows an illustrative structure of a matching target index storage area 146.

The retrieval action unit 219 performs a document retrieval by the index scan method or the text scan method. The result of a retrieval process performed by the retrieval action unit 219 is stored in the retrieval result storage area 145 (corresponding to "retrieved document ID storage unit"). FIG. 10 shows an illustrative structure of the retrieval result storage area 145. As shown in FIG. 10, the retrieval result storage area 145 stores a document ID 1451 which is the ID of a document retrieved as a retrieval result. In addition, the retrieval result storage area 145 stores an occurrence position 1452 such that the position 1452 is associated with the document ID 1451 therein. The occurrence position 1452 is a value indicating the position where a character in a keyword occurs within the document, and is used in an index search, as will be described later. It should be noted that, similarly to the retrieval result storage area 145, the matching target index storage area 146 stores a document ID 1461 and an occurrence position 1462 such that these items are associated with each other, as shown in FIG. 11. A combination of the document ID 1461 and the occurrence position 1462 stored in the matching target index storage area 146 are used in an index search, as will be described later.

The retrieval result output unit 221 outputs a result of a document retrieval, outputting on the display device 103 a list of the document IDs stored in the retrieval result storage area 145.

In the following, procedures in a document retrieval system in the present embodiment will be described.

Figure 12:
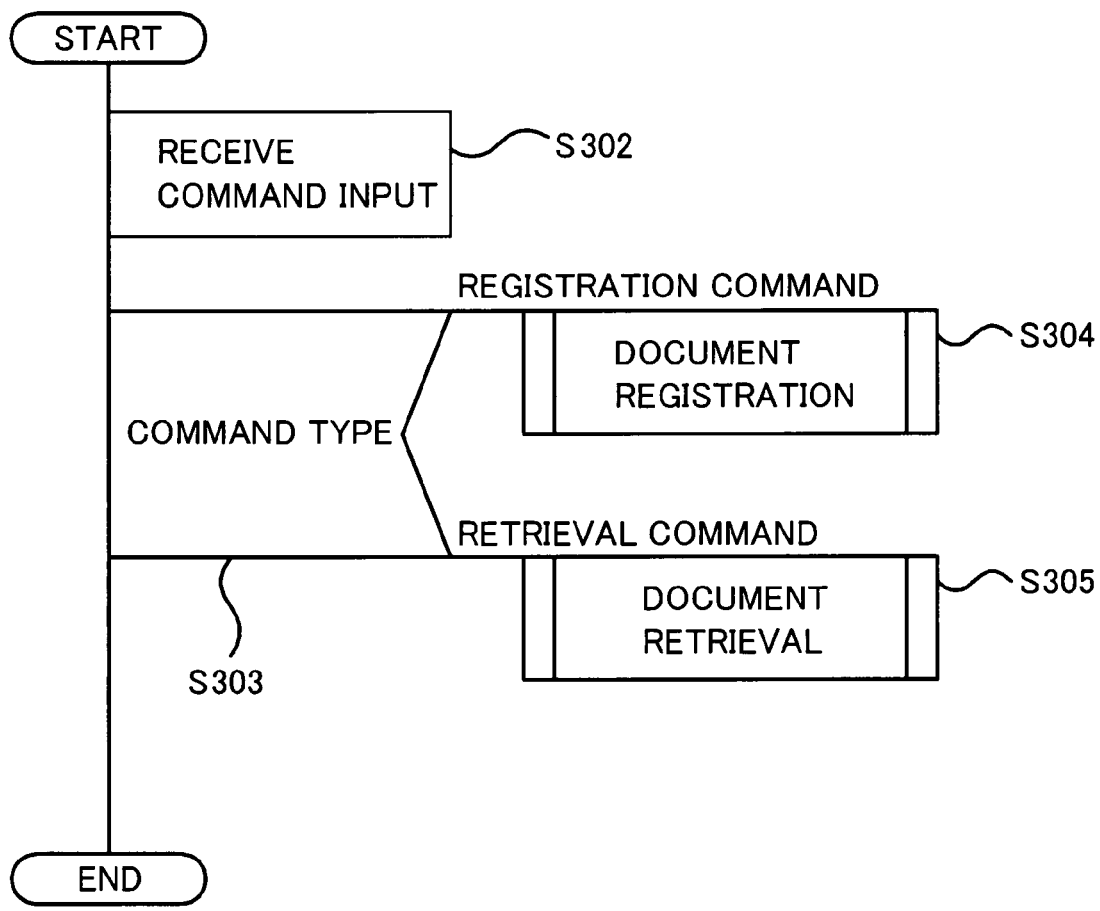
FIG. 12 is a PAD diagram illustrating a flow of a procedure performed by the retrieval apparatus 100.

FIG. 12 is a PAD diagram illustrating a flow of a process performed by the retrieval apparatus 100. The retrieval apparatus 100 receives an input of a command from a user (S302), and if the received command is a registration command (S303: Registration Command), then performs a document registration process (S304), or if the received command is a retrieval command (S303: Retrieval Command), then performs a document retrieval process (S305).

Figure 13:
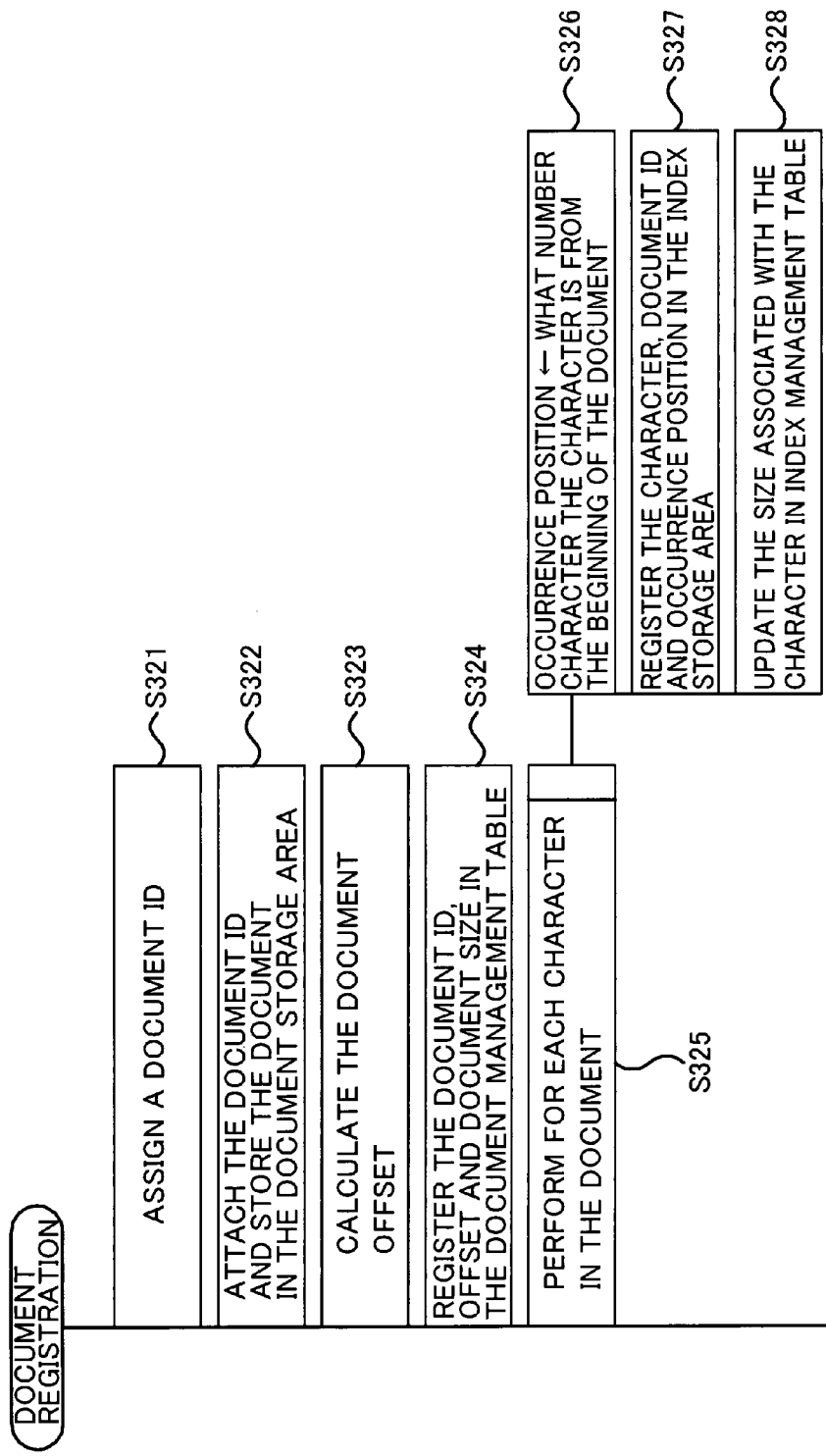
FIG. 13 is a PAD diagram illustrating a flow of a document registration process.

A flow of a document registration process is illustrated in the PAD diagram of FIG. 13. Upon receiving an input of a registration command, the retrieval apparatus 100 assigns a new document ID to the document indicated in the registration command (hereinafter referred to as registration document)(S321), and attaches the assigned document ID to the registration document, and stores it in the document storage area 141 (S322). The retrieval apparatus 100 calculates the location where the document is registered in the document storage area 141 as the offset from the first address of the document storage area 141 (S323). The retrieval apparatus 100 registers in the document management table 142 the document ID assigned to the registration document, the calculated offset, and the data size of the registration document (S324).

Then, the retrieval apparatus 100 performs the following process for each of all characters contained in the registration document, starting from the first character thereof (S325).

The retrieval apparatus 100 decides what number character the character to be processed (hereinafter referred to as "indexing target character") is from the beginning of the document, as its occurrence position (S326). The retrieval apparatus 100 creates index information in which the indexing target character, the document ID, and the occurrence position are associated with each other, and registers the created index information in the index storage area 150 (S327), and adds the data length of the created index information to the size 1512 associated with the indexing target character in the index management table 151 (S328).

Figure 14:
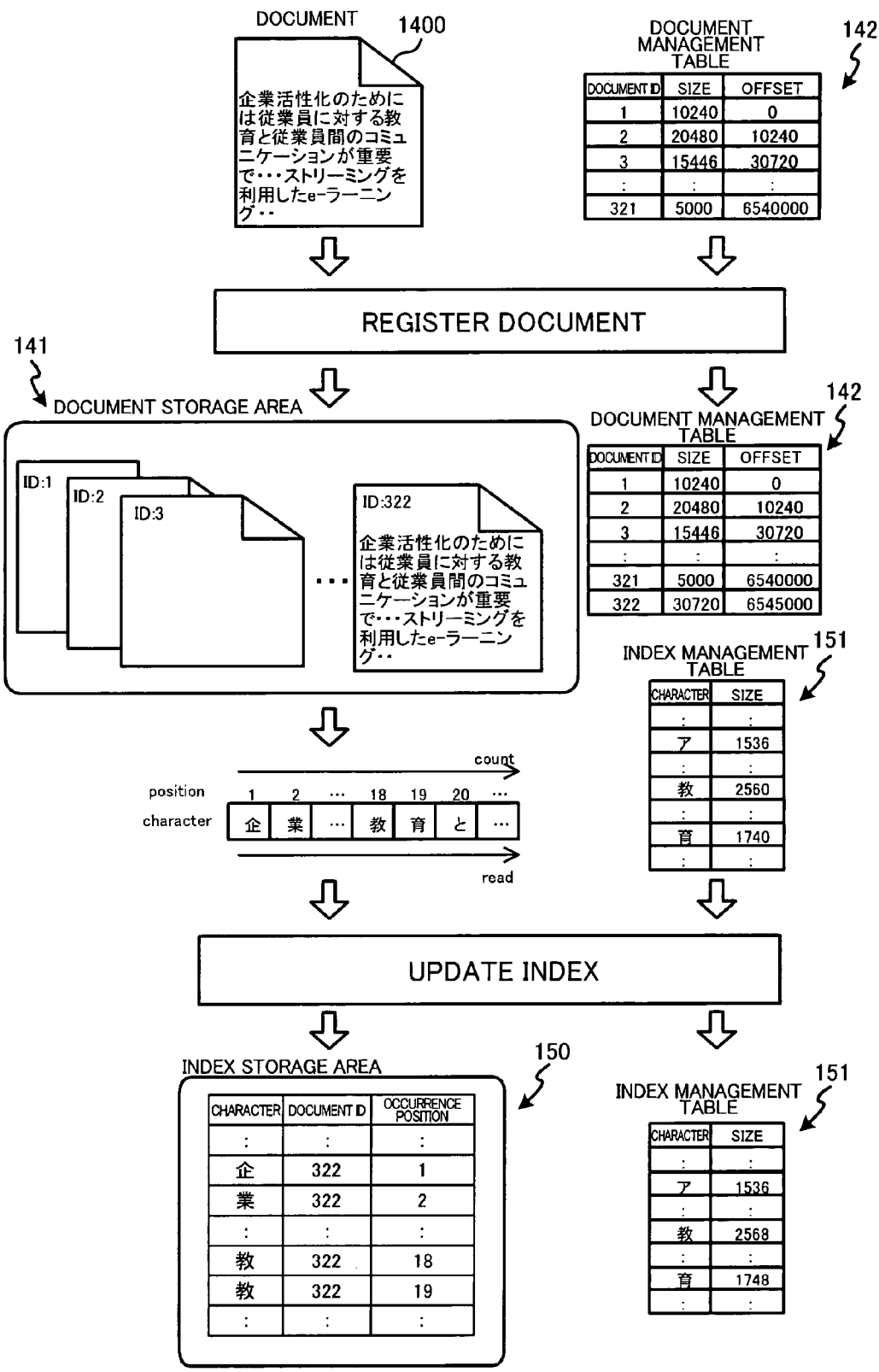
FIG. 14 specifically illustrates how a document is registered by the document registration process.

FIG. 14 specifically illustrates how a document is registered by the document registration process. In the example shown in FIG. 14, the document 1400 with a data size of "30720" bytes (hereinafter referred as registration document) is being registered. The registration document is assigned a document ID of "322", and is stored in the document storage area 141. "30720", which is the data size of the registration document, and "6545000", which is the value resulting from adding the data size of the document ID "321" to the offset of the document ID "321", are registered in the document management table 142. Then, for each of the characters written in the registration document, index information including the character, the document ID "322" and the offset from the beginning of the registration document (occurrence position) is stored in the index storage area 150, and the data size of the registered index information is added to the size 1512 associated with that character in the index management table 151.

Figure 15:
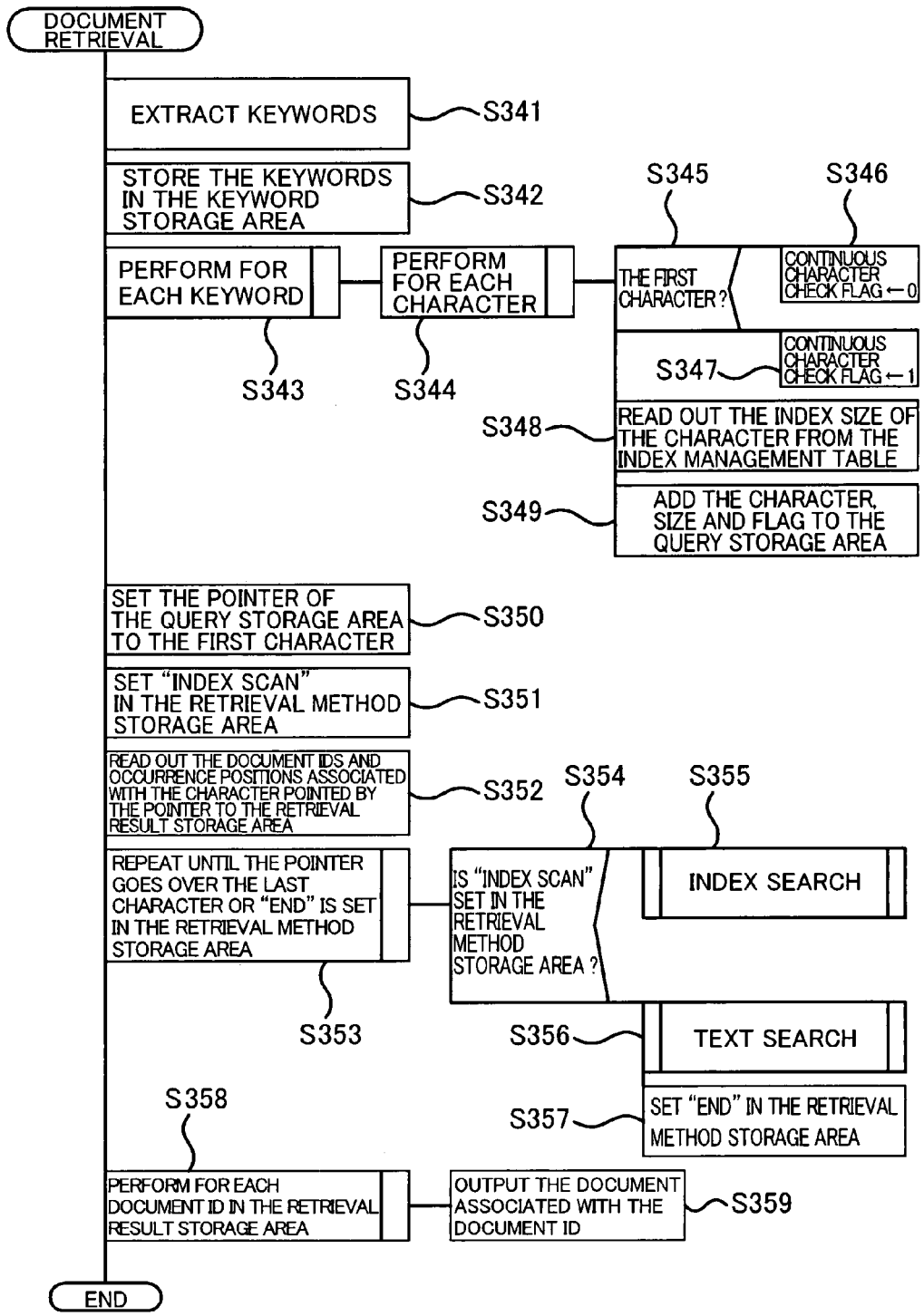
FIG. 15 is a PAD diagram illustrating a flow of a document retrieval process.

FIG. 15 is a PAD diagram illustrating a flow of a document retrieval process.

Upon receiving an input of a retrieval command, the retrieval apparatus 100 extracts keywords from the retrieval criterion contained in the retrieval command (S341), and stores the extracted keywords in the keyword storage area 140 (S342).

The retrieval apparatus 100 performs the following process for each of the keywords (S343), and performs the following process for each of the characters contained in each keyword (S344). The retrieval apparatus 100, if the currently processed character is the first character of the keyword (S345: True), then sets "0" to the continuous character check flag (S346), or if not (S345: False), then sets "1" to the flag (S347). The retrieval apparatus 100 reads out the size 1512 associated with that character from the index management table 151 (S348), and adds the read-out size 1512, that character, and the continuous character check flag to the query storage area 143 such that these items are associated with each other therein (S349).

Repeating the above process, the retrieval apparatus 100 stores the character string, which is used as a criterion for the retrieval, in the query storage area 143. After that, the apparatus 100 sets the pointer 1434 of the query storage area 143 to the first character of the string (S350).

Figure 16:
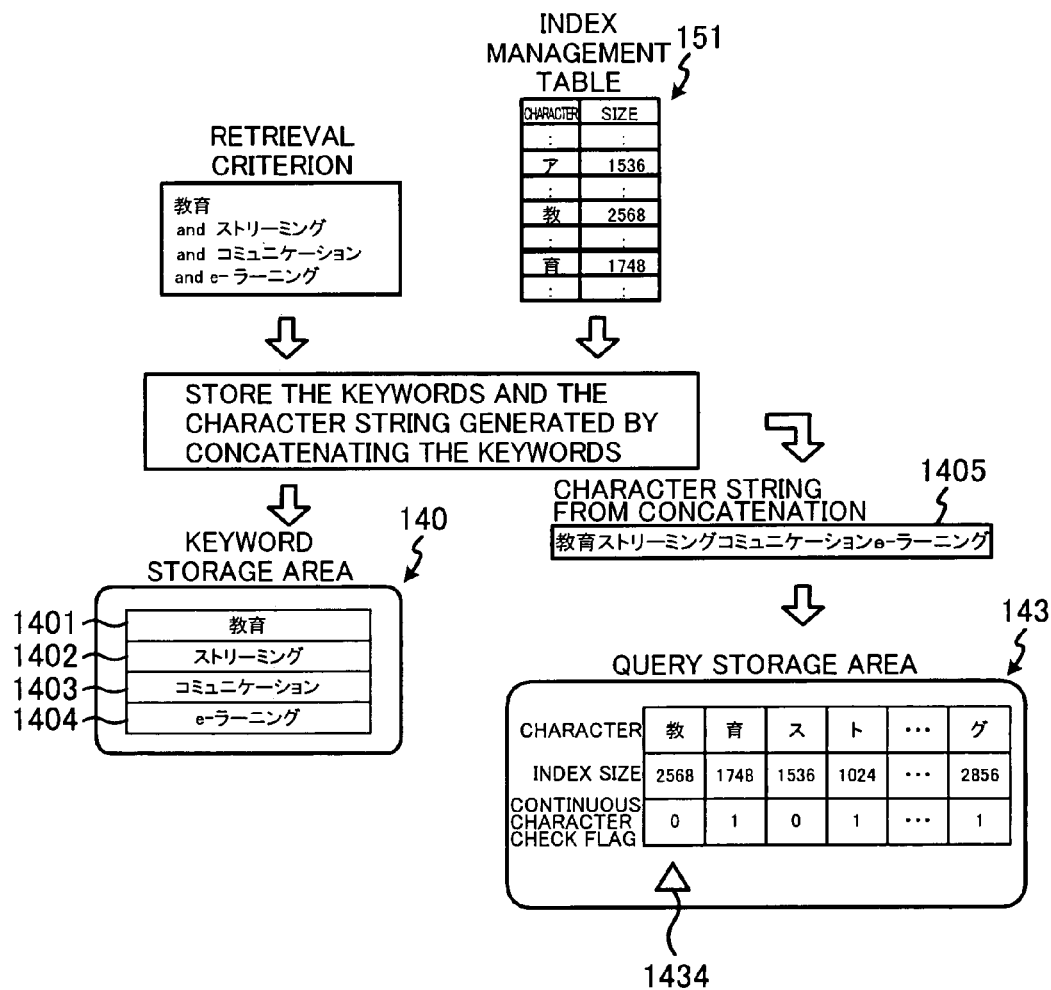
FIG. 16 specifically illustrates how a retrieval criterion is stored in the keyword storage area 140 and the query storage area 143.

FIG. 16 specifically illustrates how a retrieval criterion is stored in the keyword storage area 140 and the query storage area 143. In the example shown in FIG. 16, "教育and ストリーミングand コミュニケーションand e‐ラーニング" is provided as a retrieval criterion. The four keywords "ストリー(1401)", "ストリーミング (1402)", "コミュニケーション (1403)" and "e‐ラ教育 (1404)"are extracted from this retrieval criterion, and are stored in the keyword storage area 140. Then, for each of the characters constituting the character string 1405 ストリー教育ングコミュニケーションe‐ラーニング" generated by concatenating the four keywords, the data amount of the index information, and the continuous character check flag, which indicates whether or not the character is the first character of any keyword, are stored in the query storage area 143. In addition, the pointer 1434 which is supposed to point to the current search target character is set so as to point to the first character of the character string.

After registering a retrieval criterion by the above-mentioned process, the retrieval apparatus 100 sets "Index Scan" in the retrieval method storage area 144 (S351). This setting causes the document retrieval to be performed initially by the index scan method, as will be described below.

The retrieval apparatus 100 reads out from the index storage area 150 the document IDs 1502 and the occurrence positions 1503 associated with the character pointed by the pointer 1434, and stores the combinations of the read-out document ID and occurrence position in the retrieval result storage area 145 (S352). The retrieval apparatus 100 repeats the following process until the pointer 1434 goes over the last character or "End" is set in the retrieval method storage area 144 (S353).

If "Index Scan" is set in the retrieval method storage area 144 (S354: True), then the retrieval apparatus 100 performs an index search as described below (S355). If "Index Scan" is not set in the retrieval method storage area 144 (S354: False), then the retrieval apparatus 100 performs a text search (S356) as will be described later on, and sets "End" in the retrieval method storage area 144 (S357).

After repeating the above process, the retrieval apparatus 100 extracts the document IDs stored in the retrieval result storage area 145 without duplication, and for each of the extracted document IDs (S358), outputs the document associated with the document ID (S359).

Figure 17:
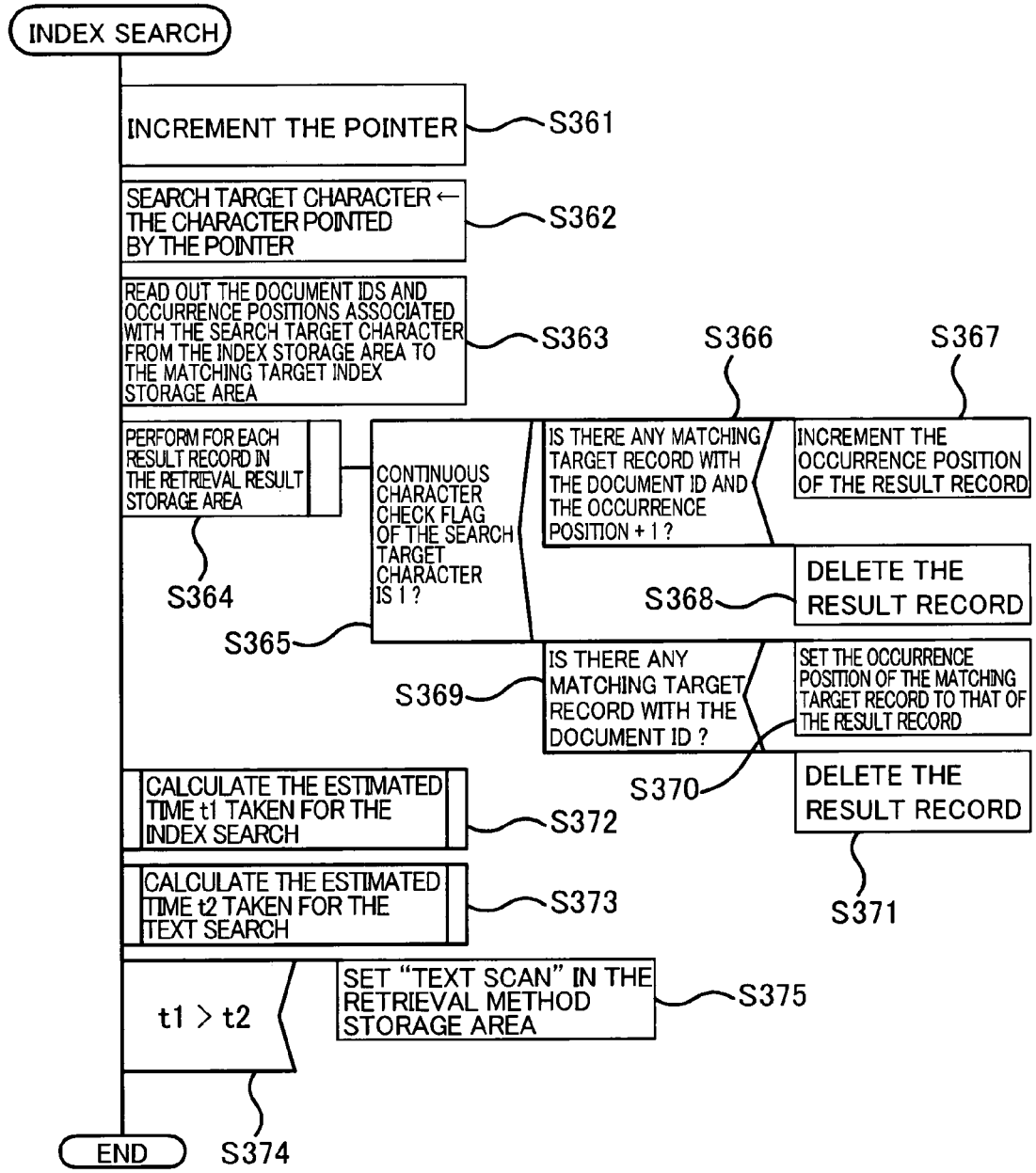
FIG. 17 is a PAD diagram illustrating a flow of an index search.

FIG. 17 is a PAD diagram illustrating a flow of an index search.

The retrieval apparatus 100 increments the pointer 1434 of the query storage area 143 (S361), and sets the character pointed by the pointer 1434 as the search target character (S362). The retrieval apparatus 100 reads out from the index storage area 150 the document IDs 1502 and the occurrence positions 1503 associated with the current search target character, and stores the combinations of the read-out document ID 1502 and occurrence position 1503 in the matching target index storage area 146 (S363). In the following description, a combination of a document ID and an occurrence position stored in the matching target index storage area 146 is referred to as "matching target record".

The retrieval apparatus 100 performs the following process for each of the combinations of document ID and occurrence position stored in the retrieval result storage area 145 (hereinafter referred to as "result record") (S364). If the continuous character check flag of the current search target character is "1" (S365: True), then the retrieval apparatus 100 decides whether any matching target record with the document ID of the current result record and the occurrence position thereof +1 is registered in the matching target index storage area 146, based on the matching target index storage area 146 (S366). If there is registered such a matching target record (S366: True), then "1" is added to the occurrence position of the current result record (S367). If there is not registered such a matching target record (S366: False), then the current result record is deleted from the retrieval result storage area 145 (S368).

On the other hand, if the continuous character check flag of the current search target character is "0" (S365: False), then the retrieval apparatus 100 decides whether any matching target record with the document ID of the current result record is registered in the matching target index storage area 146 (S369). If there is registered such a matching target record (S369: True), then the occurrence position of that matching target record is set to the occurrence position of the result record (S370). If there is not registered such a matching target record (S369: False), then the current result record is deleted from the retrieval result storage area 145 (S371). By repeating this process, the retrieval apparatus 100 checks whether each of the documents stored in the retrieval result storage area 145 contains the search target character.

Figure 18:
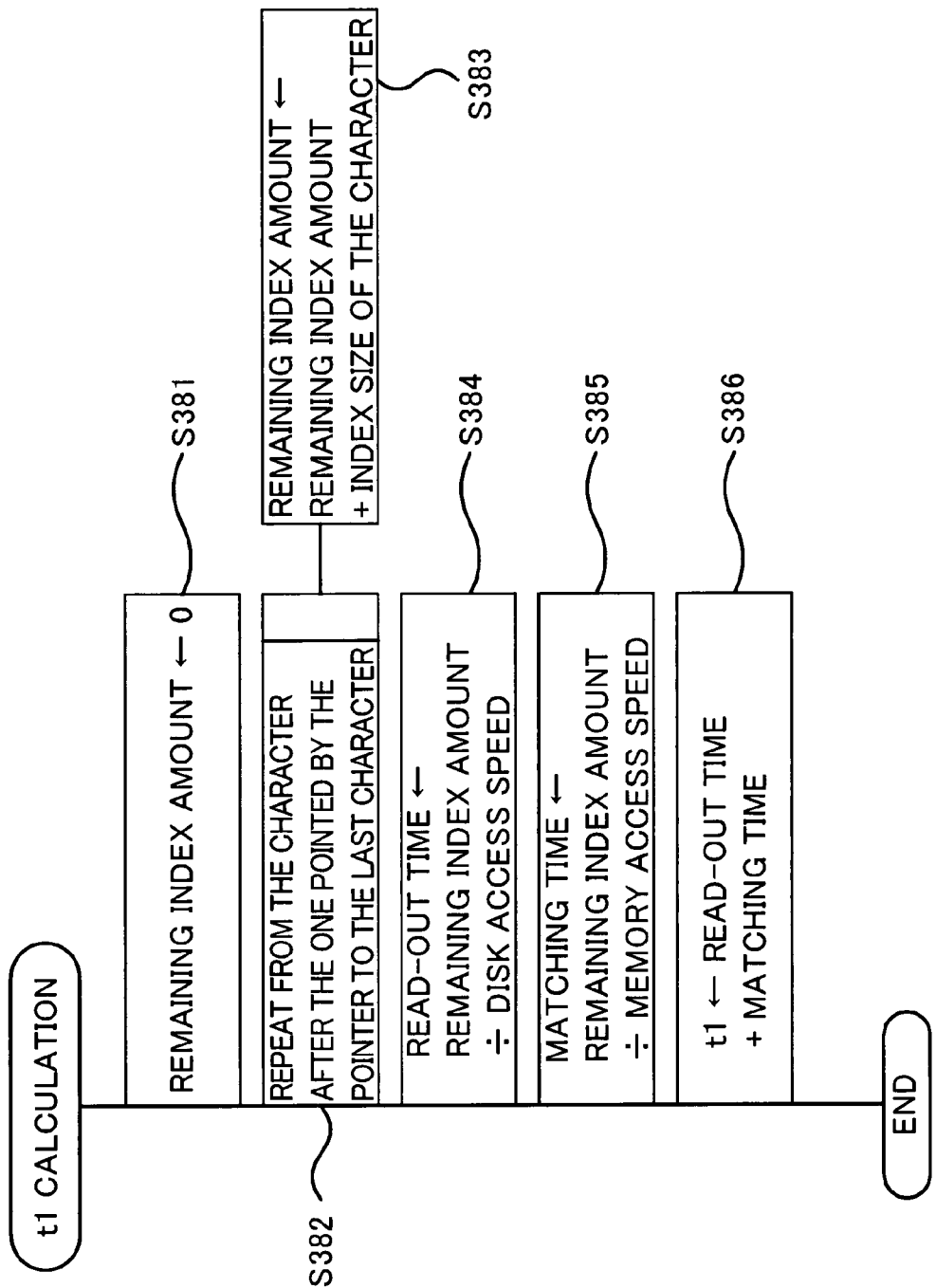
FIG. 18 is a PAD diagram illustrating a flow of a t1 calculation process.

Next, the retrieval apparatus 100 performs a process of calculating a t1, which is the estimated time it will take to perform the index search for the rest of the characters, the characters after the one pointed by the pointer 1434 (S372). FIG. 18 is a PAD diagram illustrating a flow of the t1 calculation process.

The retrieval apparatus 100 sets "0" to a remaining index size (S381), and for each of the characters from the character following the one pointed by the pointer 1434 to the last one in the query storage area 143 (S382), adds the index size of the current character to the remaining index size (S383). Then, the retrieval apparatus 100 obtains the read-out time by dividing the remaining index size by the disk access speed (S384), and the matching time by dividing the remaining index size by the memory access speed (S385). The retrieval apparatus 100 calculates the t1 by adding the obtained read-out time and matching time (S386).

Figure 19:
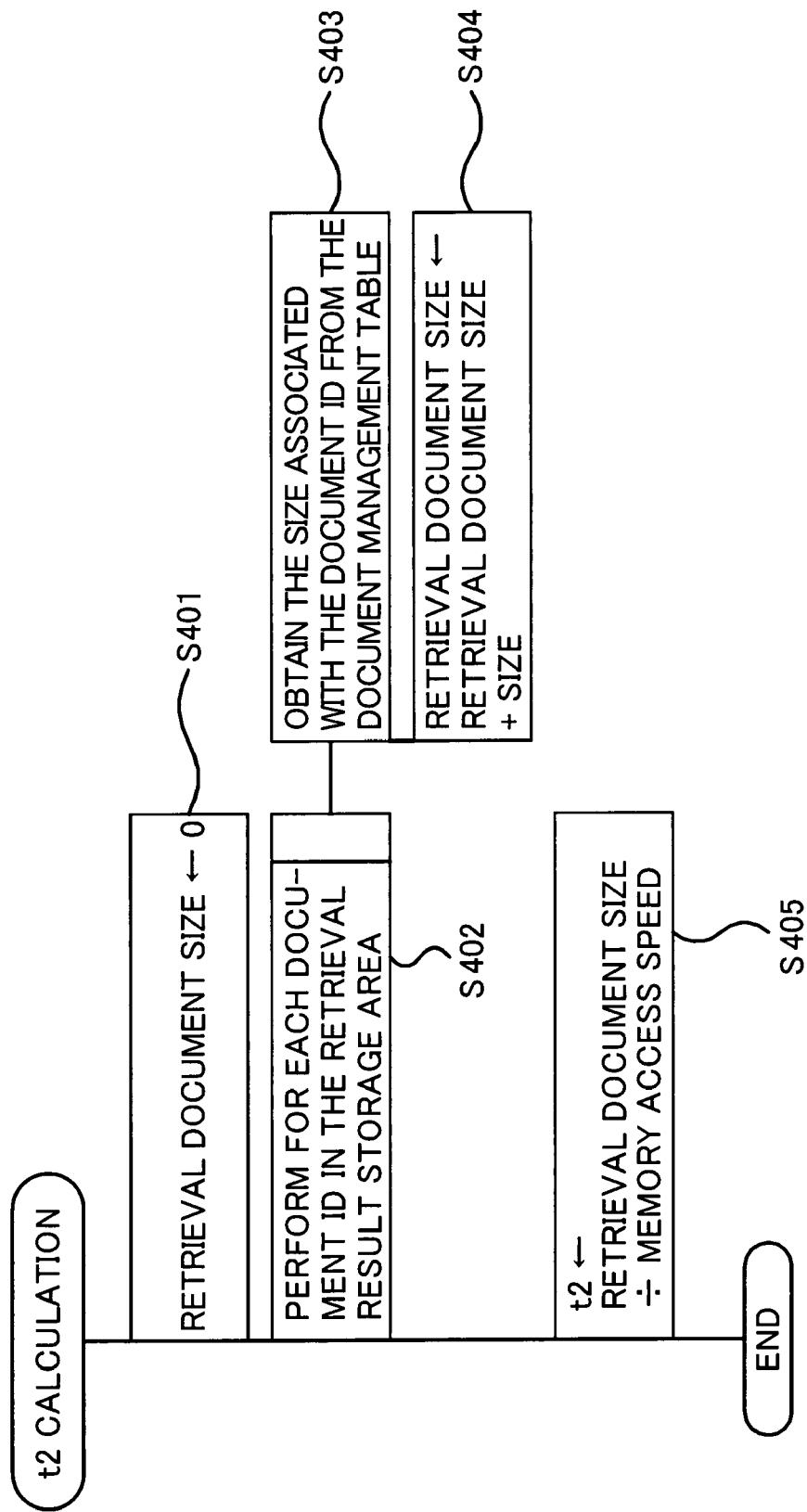
FIG. 19 is a PAD diagram illustrating a flow of a t2 calculation process.

After calculating the t1 in this way, the retrieval apparatus 100 performs a process of calculating a t2, which is the estimated time it will take to perform the text search from then using character strings of keywords (S373). FIG. 19 is a PAD diagram illustrating a flow of the t2 calculation process.

The retrieval apparatus 100 sets "0" to a retrieval document size (S401). The retrieval apparatus 100 reads out the document IDs without duplication from the retrieval result storage area 145, and performs the following process for each of the read out document IDs (S402). The retrieval apparatus 100 obtains the size 1412 associated with the current document ID from the document management table 142 (S403), and then adds the obtained size 1412 to the retrieval document size (S404). By repeating this process, the retrieval apparatus 100 calculates the retrieval document size. Then, the apparatus 100 calculates the t2 by dividing the calculated retrieval document size by the memory access speed (S405).

After calculating the t1 and the t2 in this way, the retrieval apparatus 100 decides whether the t1 exceeds the t2 (S374). If the t1 is greater than the t2 (S374: True), then the apparatus 100 sets "Text Scan" in the retrieval method storage area 144 (S375).

An index search is performed in the above-mentioned way.

It should be noted that the retrieval apparatus 100 in the present embodiment utilizes the document management table 142 in order to calculate the data amount of documents to be searched. Therefore, the apparatus 100 does not need to, for each of target documents, read out the data size from the document storage area 141. This allows a process of obtaining the data sizes of target documents to be sped up.

In some embodiments, the above-mentioned steps S372 to S375 may be performed concurrently during the process of checking result records against matching target records (S364 to S371).

Figure 20:
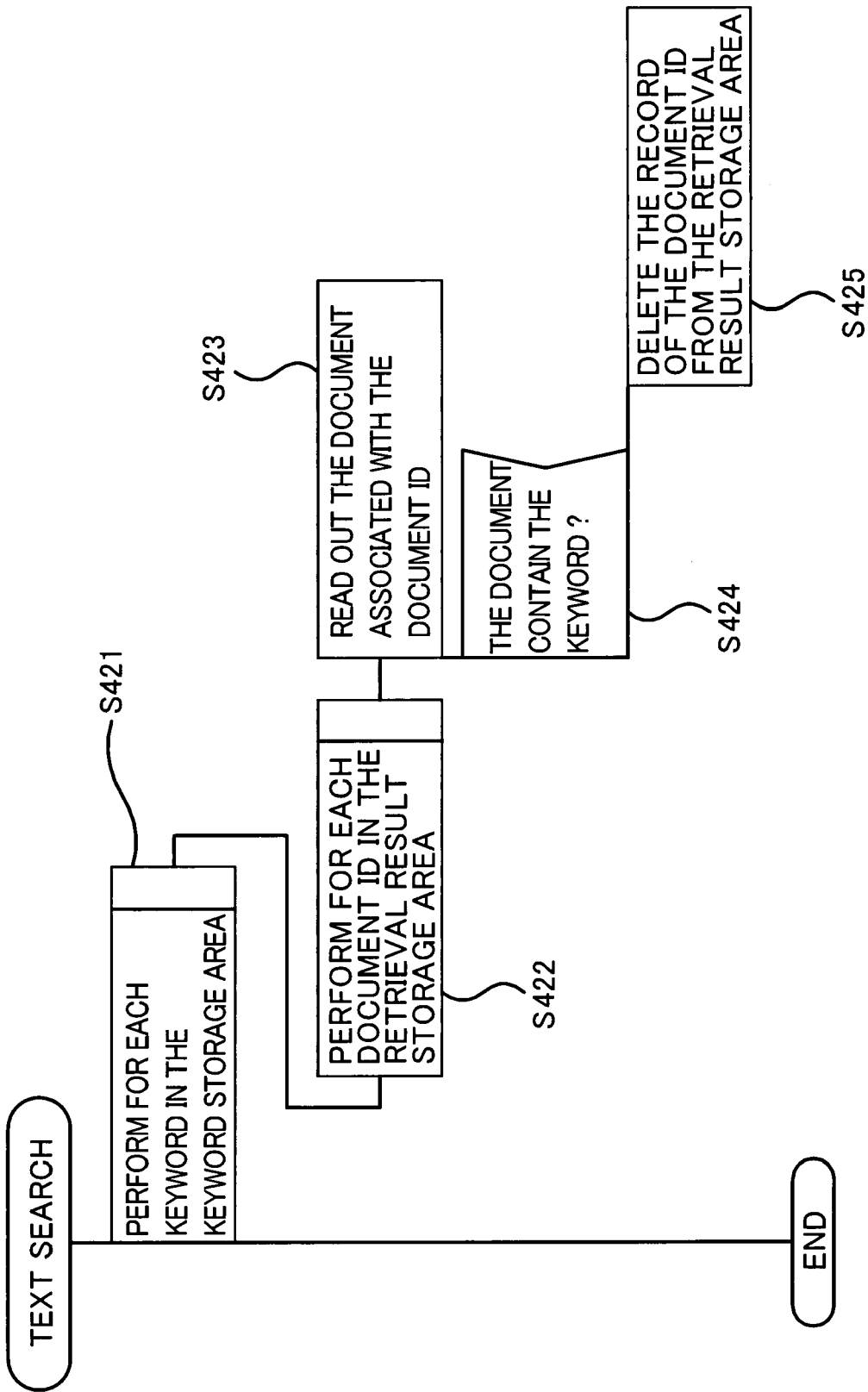
FIG. 20 is a PAD diagram illustrating a flow of a text search.

FIG. 20 is a PAD diagram illustrating a flow of a text search.

The retrieval apparatus 100 performs the following process for each of the keywords stored in the keyword storage area 140 (S421). The retrieval apparatus 100 reads out the document IDs stored in the retrieval result storage area 145 without duplication, and for each of the read out document IDs (S422), reads out the document associated with the document ID from the document storage area 141 (S423). Then, the apparatus 100 decides whether the read out document contains the keyword (S424), and if the document does not contain it (S424: False), then deletes the record corresponding to the document ID from the retrieval result storage area 145 (S425).

Figure 21:
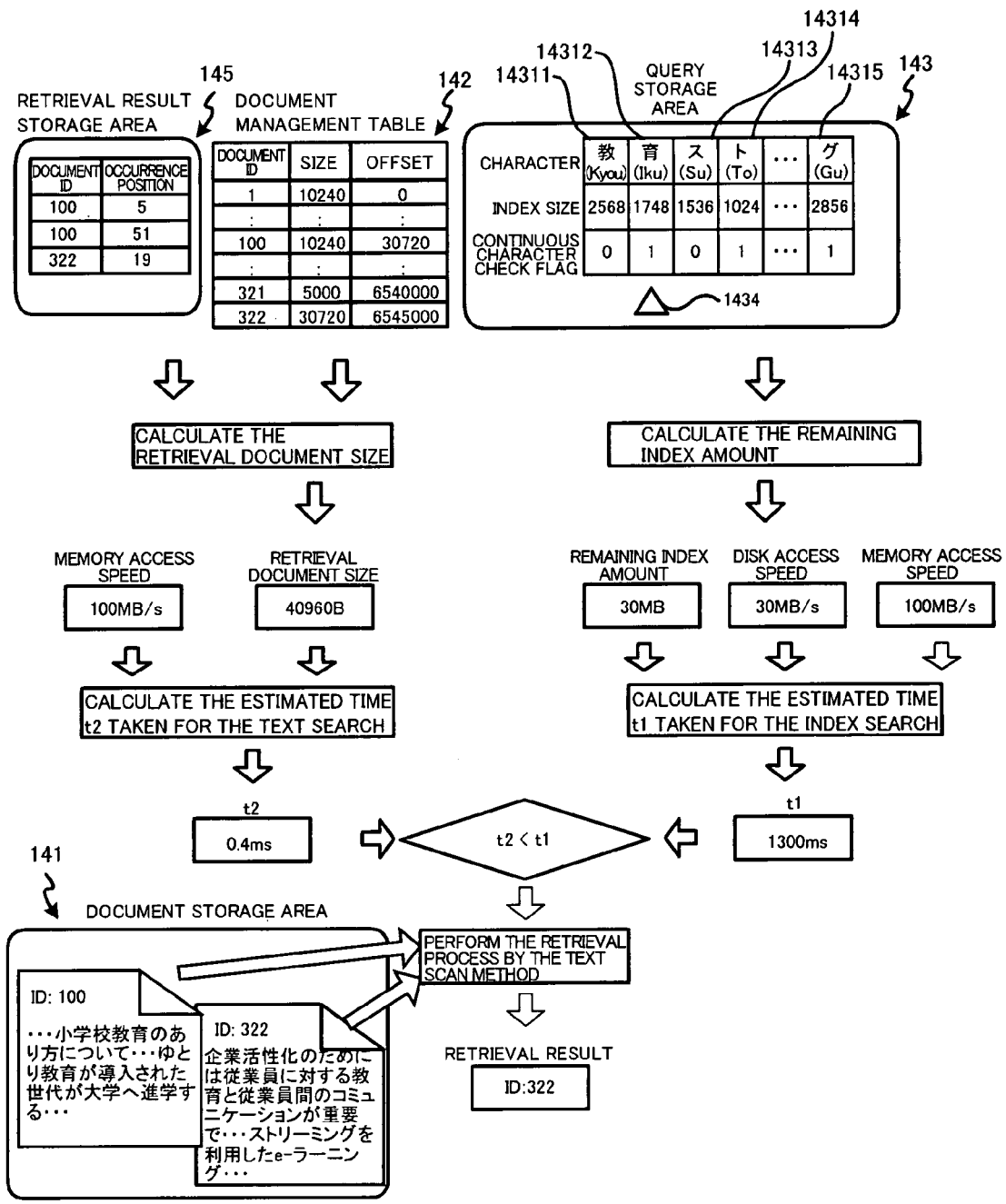
FIG. 21 specifically illustrates the document retrieval process.

In the above manner, the retrieval apparatus 100 performs a document retrieval according to a retrieval criterion included in a retrieval command. FIG. 21 specifically illustrates the document retrieval process. In the example shown in FIG. 21, "教育and ストリーミングand コミュニケーションand e-ラーニング" has been provided as a retrieval criterion. By the process similar to the before-mentioned example shown in FIG. 16, the keywords and the character string have been registered in the keyword storage area 140 and the query storage area 143, respectively.

In the example in FIG. 21, the document retrieval process has been already performed with regards to the characters 14311 "Kyou" and 14312 "Iku" by taking the steps S361 to S368 in FIG. 17, and therefore the pointer 1434 points to the character 14312 "Iku". Now, three result records, which are the result of the retrieval process until then, are stored in the retrieval result storage area 145. That means, in the example in FIG. 21, the target documents are narrowed down to the documents respectively having the document IDs "100" and "322".

The t1, the estimated time in the case of performing the index search from then, is obtained by the process illustrated in FIG. 18 as follows. First, for reading out to the matching target index storage area 146 the index information of the characters 14313 "Su" to 14315 "Gu", if the total of the index sizes of the characters 14313 "Su" to 14315 "Gu" is "30 (MB)", then, the read-out time taken will be "30 (MB)÷30 (MB/sec)=1000 (ms)". Meanwhile, as to the matching time taken for checking the index information stored in the retrieval result storage area 145 against the index information stored in the matching target index storage area 146, its approximate value is obtained by dividing "30 (MB)", which is the data amount of the index information stored in the matching target index storage area 146, by the memory access speed "100 (MB/second)". Thus, the matching time will be approximately "30 (MB)÷100 (MB/sec)=300 (ms)". Now, the t1 is calculated as the sum of the read-out time plus the matching time, "1000 (ms)+300 (ms)=1300 (ms)".

On the other hand, the t2, the estimated time in the case of performing the text search from then, is calculated by the process shown in FIG. 19. Since the memory access speed, which is the speed to access the above-listed two documents, is "100 (MB/sec)" and the total data amount of the two documents is "40960 (bytes)", the t2 is "40960 (bytes)÷100 (MB/sec)=0.4 (ms)".

Then, the t1 and the t2 are compared in the step S374 in FIG. 17, and if the t2, the estimated time for the text search, is shorter than the t1, the estimated time for the index search, the document retrieval is continued using the text scan method from then. In other words, the target documents have been narrowed down to the documents respectively having the document IDs "100" and "322" by performing the index search with regards to the characters 14311 "Kyou" and 14312 "Iku", and then the keywords are searched by the text scan method in the thus narrowed-down-to two documents, the documents with the IDs "100" and "322".

It will be appreciated from the foregoing explanation that, according to the retrieval apparatus 100 in the present embodiment, a number of advantages can be provided. For example, each time a retrieval process is performed with regards to each character contained in a retrieval criterion, it is possible to compare the estimated time taken in the case of performing the index search with regards to the remaining characters and the estimated time taken in the case of performing the text search against the target documents narrowed down to by the retrieval process until then, and switch the retrieval method accordingly. As a result, the time taken for a document retrieval can be shortened. In particular, when the number of target documents becomes small after a retrieval process is performed with regards to a character in a retrieval criterion, it may take less time to read out all of the narrowed down target documents and perform the text search, than to read out the index information from the index storage area 150. In such a case, switching the retrieval method to the text scan method allows the retrieval time to be shortened.

Moreover, according to the retrieval apparatus 100 in the present embodiment, because data sizes of documents are stored in the document management table 142 in advance, a calculation of the total data size of all target documents can be performed without requiring a process for obtaining the data size of each of the documents stored in the document storage area 141. This provides a faster calculation of the total data size of all target documents. As a result, it is possible to speed up a calculation of an estimated time taken for a text search, since this calculation uses the total data size of the documents. This allows a time taken for a whole document retrieval process in the retrieval apparatus 100 to be further reduced.

Now, those skilled in the art will appreciate that a number of variations of the retrieval apparatus 100 and corresponding algorithms are possible. Some non-limitative examples thereof are described below.

==First Variation: for the Case that Target Documents are Written in a Language Other than Japanese==

In the retrieval apparatus 100 in the illustrative embodiment discussed above, documents to be registered and documents to be searched are assumed to be written in Japanese. However, documents to be registered and documents to be searched may be written in English or other languages in which word boundaries are defined by, for example, white spaces, punctuations or the like.

Figure 23:
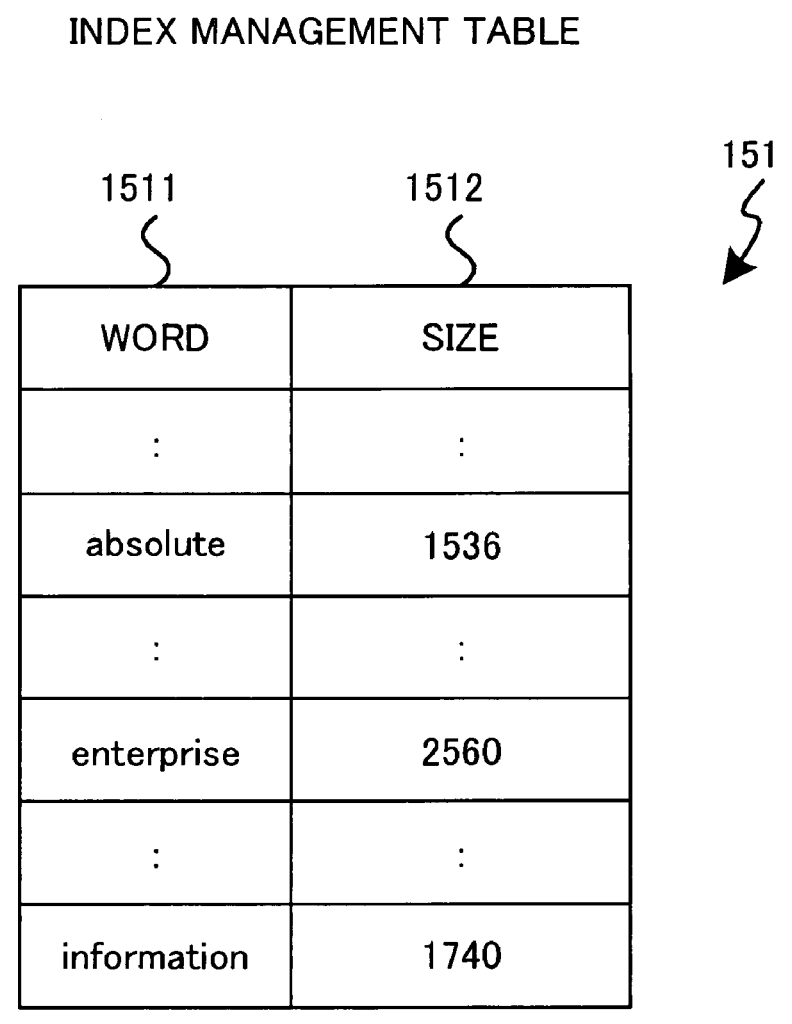

FIG. 22 shows an illustrative structure of indices stored in the index storage area 150 in this case. As shown in FIG. 22, the index storage area 150 stores information including the document ID 1502 which indicates a document containing a word 1501, and the occurrence position 1503 indicating where the word 1501 occurs within the document indicated by the document ID 1502 (this information is hereinafter referred to as "index information") such that this information is associated with the word 1501 therein. In the embodiment in this case, so-called word indices are created. Thus, for each of all of the words 1501 occurring within a document, the above-mentioned index information is stored in the index storage area 150. Likewise, the index management table 151 is managed on the word basis rather than the character basis. FIG. 23 shows an illustrative structure of the index management table 151 in this case.

Figure 24:
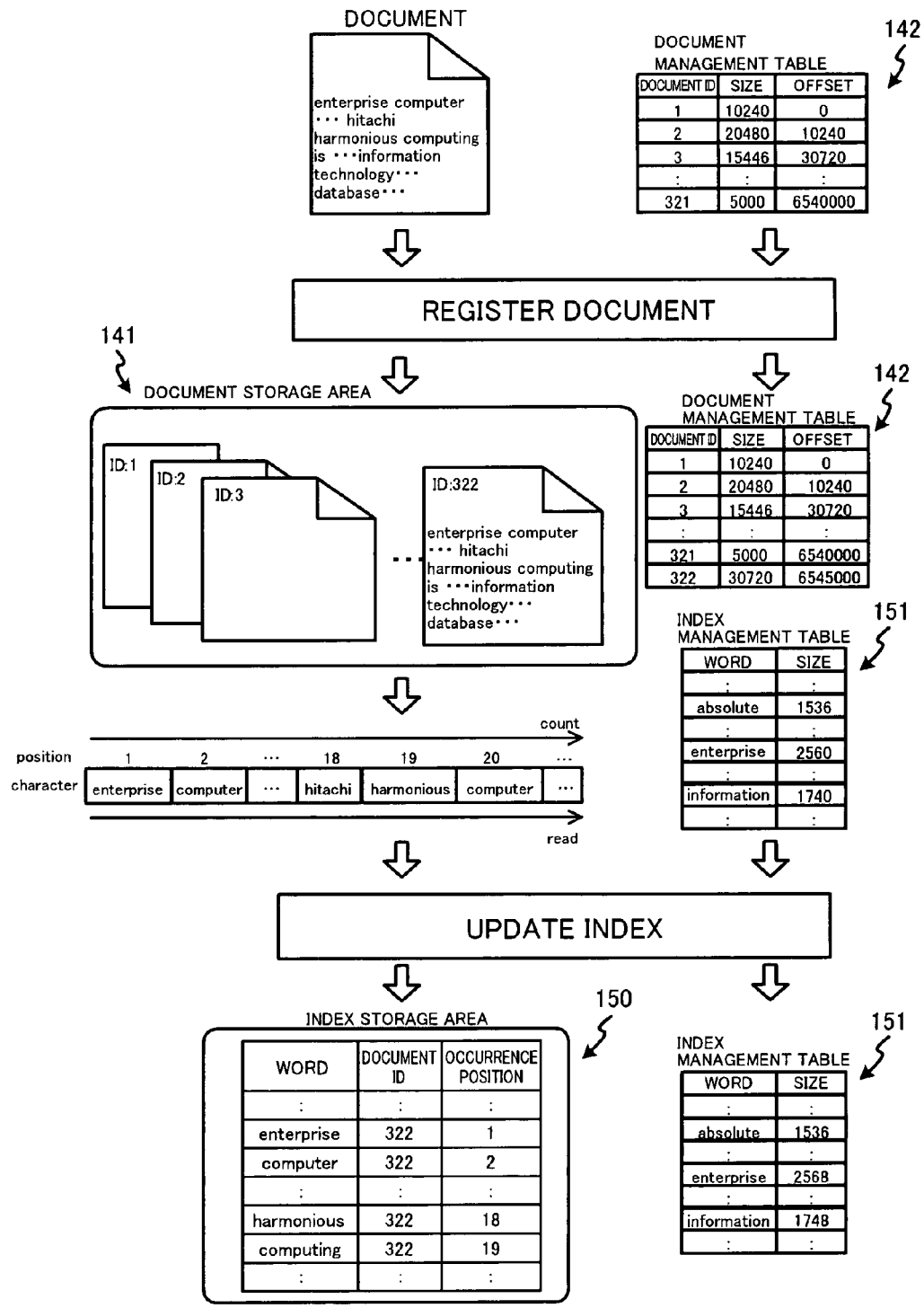
FIG. 24 specifically illustrates how a document is registered by the document registration process in the embodiment wherein word-based indices are generated.

FIG. 24 specifically illustrates how a document is registered by the document registration process. In the example shown in FIG. 24, the document "enterprise computer . . . hitachi harmonious computing is . . . information technology . . . database . . . " with a data size of "30720" bytes (hereinafter referred to as registration document) is being registered. This registration document is assigned the document ID "322" and is stored in the document storage area 141. "30720", which is the data size of the registration document, and "6545000", which is the value resulting from adding the size of the document ID "321" to the offset of the document ID "321", are registered in the document management table 142. Then, for each of the words written in the registration document such as "enterprise" and "hitachi", the word and the index information including the document ID "322" and the offset from the beginning of the document (occurrence position) are stored in the index storage area 150, and the data size of the registered index information is added to the size 1512 associated with that word in the index management table 151.

Figure 25:
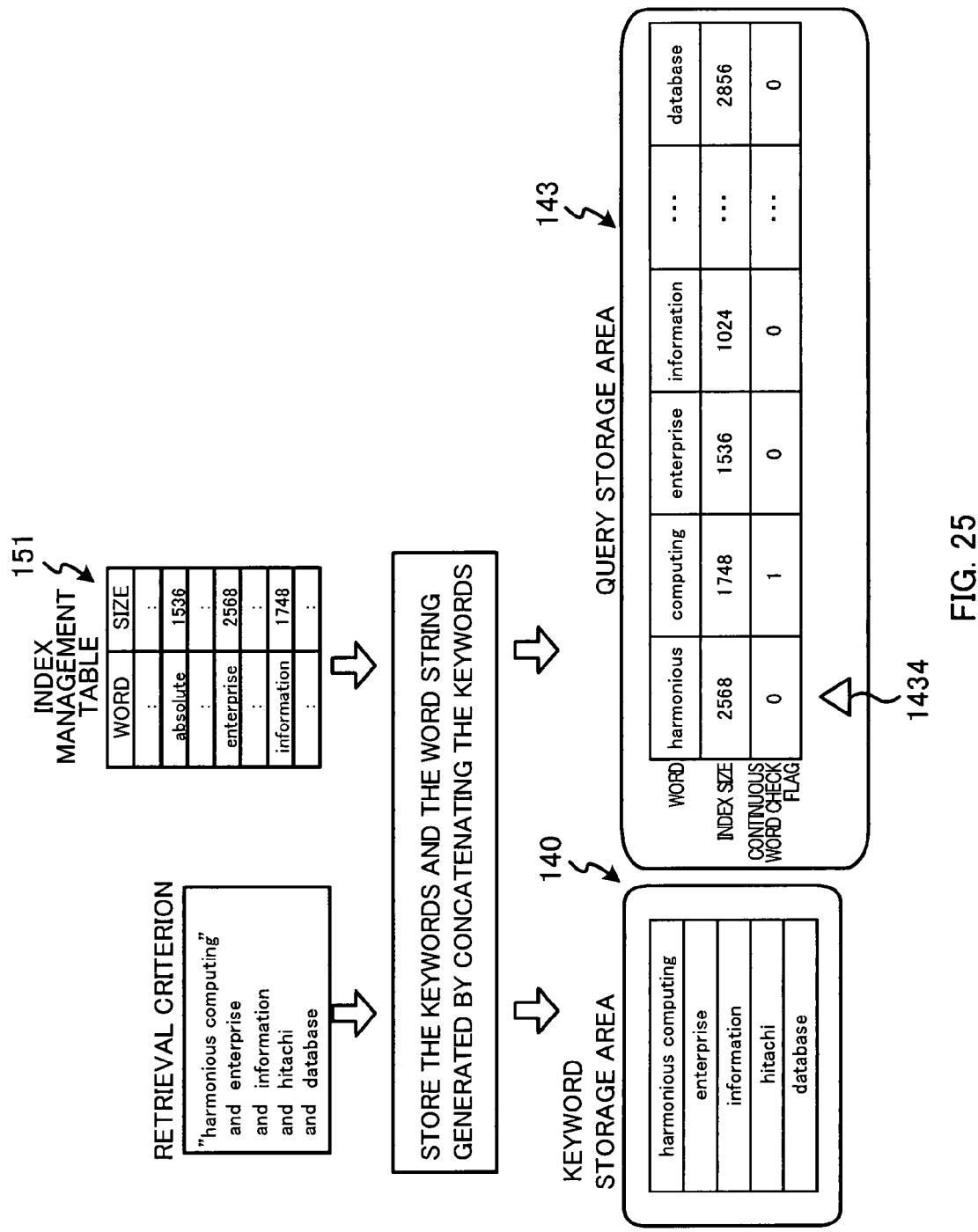
FIG. 25 specifically illustrates how a retrieval criterion is stored in the keyword storage area 140 and the query storage area 143 in the embodiment wherein word-based indices are generated.

FIG. 25 specifically illustrates how a retrieval criterion is stored in the keyword storage area 140 and the query storage area 143. In the example shown in FIG. 25, "'harmonious computing" AND enterprise AND information AND hitachi AND database" is provided as a retrieval criterion. The five keywords "harmonious computing", "enterprise", "information", "hitachi" and "database" are extracted from this retrieval criterion, and are stored in the keyword storage area 140. Then, for each of the words constituting the five keywords, the data amount of the index information and the continuous word check flag, which indicates whether or not the word is the first word of any keyword, are stored in the query storage area 143. Furthermore, the pointer 1434 which is supposed to point to the current search target word is set so as to point to the first word of the word string.

Figure 26:
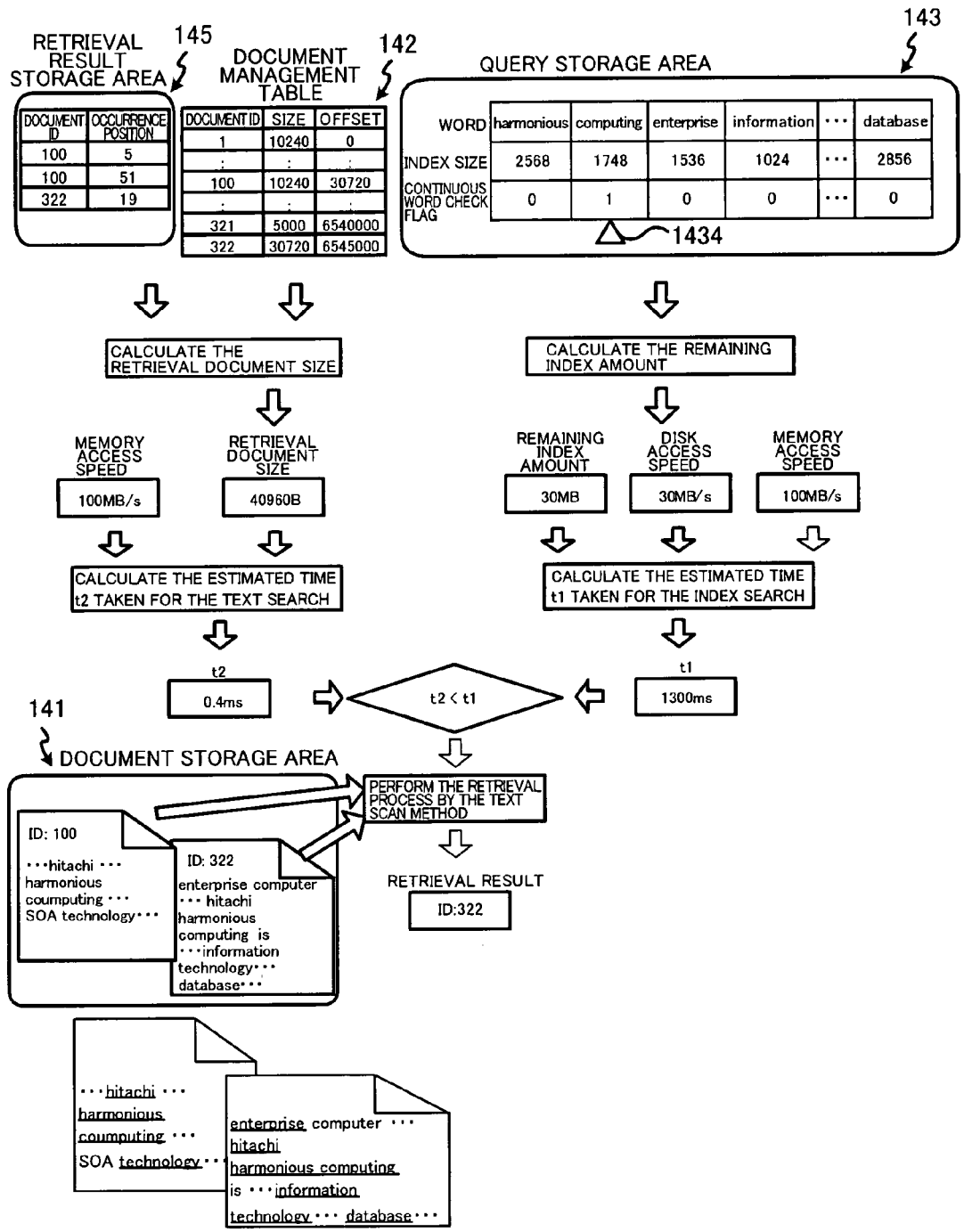
FIG. 26 specifically illustrates the document retrieval process in the embodiment wherein word-based indices are generated.

FIG. 26 specifically illustrates how a document retrieval is performed in this case. In the example shown in FIG. 26, the retrieval criterion "'harmonious computing' AND enterprise AND information AND hitachi AND database" has been provided, and by performing the process similar to the before-discussed example shown in FIG. 16, the keywords and the word string have been registered in the keyword storage area 140 and the query storage area 143, respectively.

In the example shown in FIG. 26, the document retrieval has been already performed with regards to the words "harmonious" and "computing" by taking the steps S361 to S368 as shown in FIG. 17, and therefore the pointer 1434 points to the word "computing". Now, three result records, which are the result of the retrieval process until then, are stored in the retrieval result storage area 145. This means, in the example in FIG. 26, the target documents are narrowed down to the documents respectively having the document IDs "100" and "322".

The t1, which is the estimated time taken in the case of performing the index search from then is obtained by the process illustrated in FIG. 18 as follows. First, for reading out to the matching target index storage area 146 the index information of the words from "enterprise" to "database", if the total of the index sizes of the words from "enterprise" to "database" is "30 (MB)", then, the read-out time taken will be "30 (MB)÷30 (MB/sec)=1000 (ms)". Meanwhile, as to the matching time taken for checking the index information stored in the retrieval result storage area 145 against the index information stored in the matching target index storage area 146, its approximate value is obtained by dividing "30 (MB)", which is the data amount of the index information stored in the matching target index storage area 146, by the memory access speed "100 (MB/sec)". Thus, the matching time will be approximately "30 (MB)÷100 (MB/sec)=300 (ms)". Now, the t1 is calculated as the sum of the read-out time plus the matching time, "1000 (ms)+300 (ms)=1300 (ms)".

On the other hand, the t2, which is the estimated time taken in the case of performing the text search from then, is calculated by the process shown in FIG. 19. Since the memory access speed, which is the speed to access the above-listed two documents, is "100 (MB/sec)" and the total data amount of the two documents is "40960 (bytes)", the t2 is "40960 (bytes)÷100 (MB/sec)=0.4 (ms)".

Next, the t1 and the t2 are compared in the step S374 shown in FIG. 17, and if the t2, the estimated time for the text search, is shorter than the t1, the estimated time for the index search, the document retrieval process from then is performed by the text scan method. In other words, the target documents have been narrowed down to the documents respectively having the document IDs "100" and "322" by performing the index search using the words "harmonious" and "computing", and then the keywords are searched by the text scan method in the thus narrowed-down-to two documents, the documents with the IDs "100" and "322".

==Second Variation: for the Case that Target Documents are Stored in the Magnetic Disk Device 107==

Figure 27:
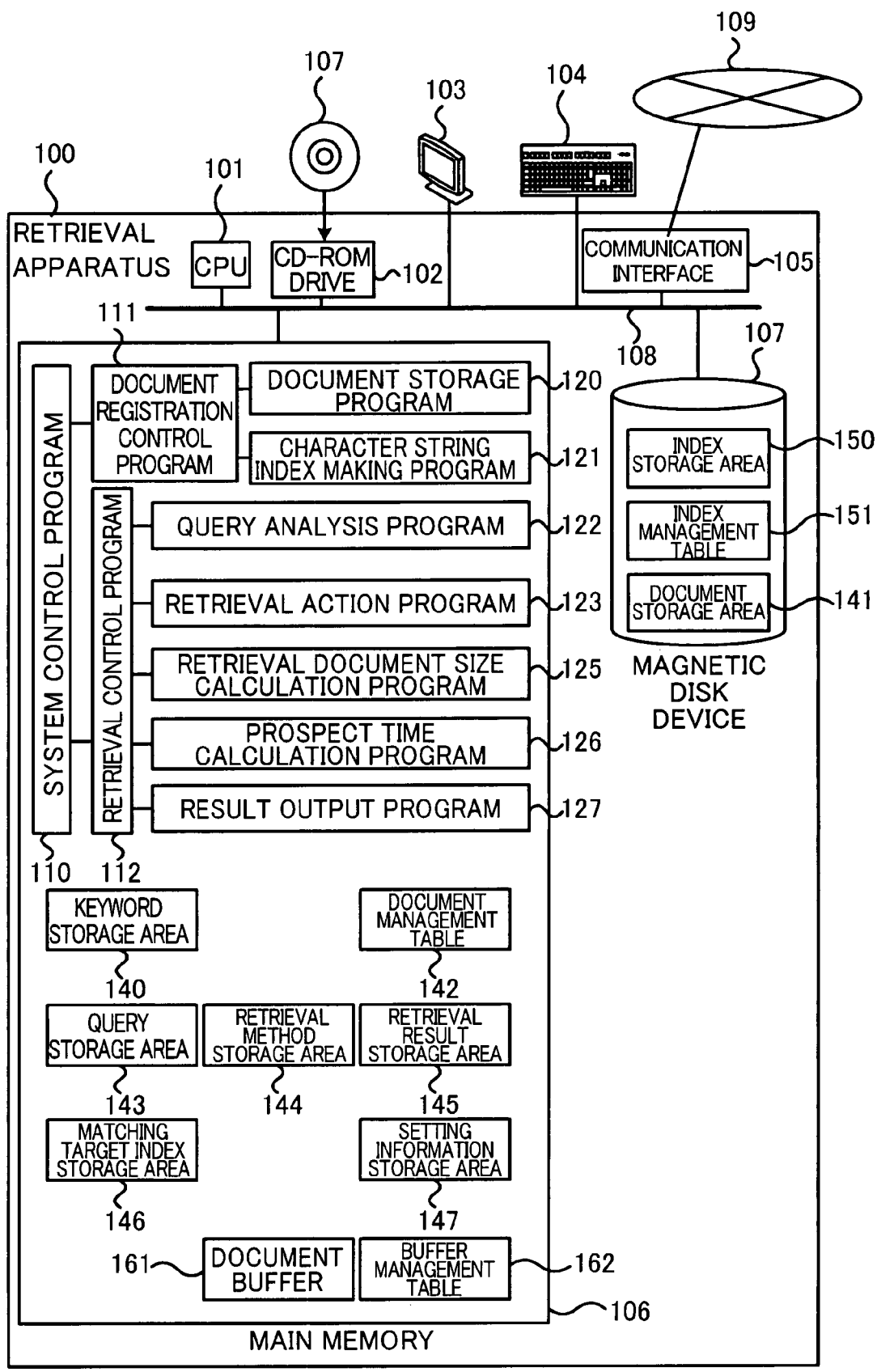
FIG. 27 shows an illustrative hardware structure of the retrieval apparatus 100 in an embodiment wherein the document storage area 141 is provided in a magnetic disk device 107.
Figure 28:
FIG. 28 illustrates a buffer management table 162 with document IDs stored therein.

In the retrieval apparatus 100 in the illustrative embodiment discussed above, documents are stored in the document storage area 141 which is reserved in the main memory 106. However, documents may be stored in the magnetic disk device 107. FIG. 27 shows an illustrative hardware structure of the retrieval apparatus 100 in this case. In the embodiment shown in FIG. 27, the document storage area 141 is reserved in the magnetic disk device 107, and a storage area of a document buffer 161 is reserved in the main memory 106 and a buffer management table 162 is stored in the main memory 106. The document buffer 161 is a storage area for caching a document stored in the document storage area 141 in the magnetic disk device 107. The buffer management table 162 manages a document ID indicating a document cached in the document buffer 161. FIG. 28 illustrates the buffer management table 162 with document IDs stored therein. The document buffer 161 and the buffer management table 162 are, for example, managed by an operating system running on the retrieval apparatus 100.

Figure 29:
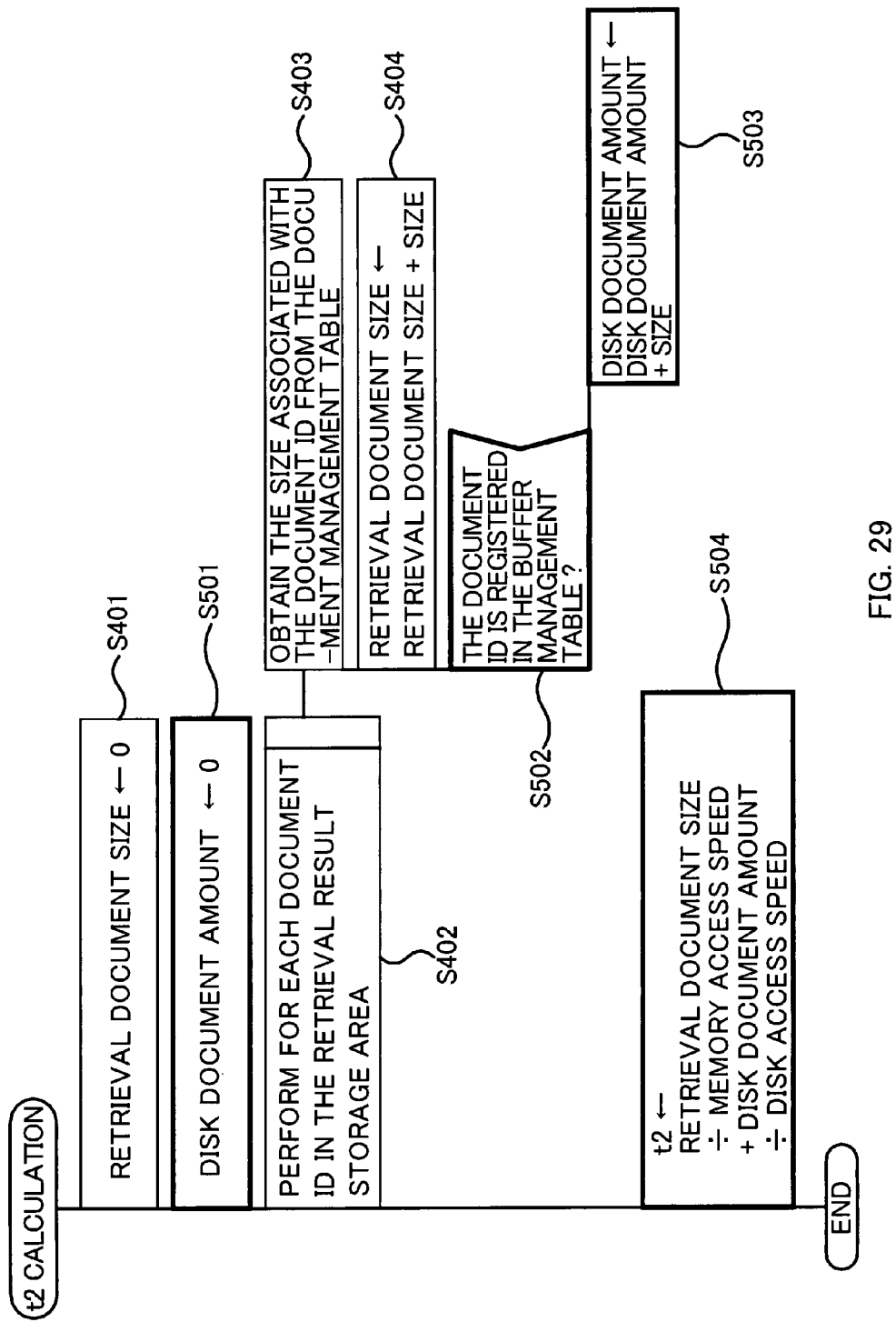
FIG. 29 is a PAD diagram illustrating a flow of the t2 calculation process in the embodiment of taking a time for reading out data from the magnetic disk device 107 to a main memory 106 into consideration.

In the case that the document storage area 141 is provided in the magnetic disk device 107 as mentioned above, when performing the before-discussed t2 calculation process shown in FIG. 19, the time to read out data from the magnetic disk device 107 to the main memory 106 should be also taken into consideration. FIG. 29 is a PAD diagram illustrating a flow of a t2 calculation process in this case. As shown in FIG. 29, the retrieval apparatus 100 initializes a retrieval document size to "0" (S401), and a disk document amount to "0" (S501). Then, for each of the document IDs 1451 stored in the retrieval result storage area 145 (S402), if the document ID 1451 is not registered in the buffer management table 162 (S502: False), the apparatus 100 adds the data size thereof to the disk document amount (S503). Then, the apparatus 100 calculates the checking time taken for searching documents that are read out to the main memory 106 by dividing the retrieval document size by the memory access speed, and also calculates the read-out time taken for reading out documents that are not cached in the document buffer 161 from the magnetic disk device 107 to the main memory 106 by dividing the disk document amount by the disk access speed, and then calculates the t2 by adding the calculated checking time and read-out time (S504).

In this way, a t2 can be calculated taking the time for reading out documents from the magnetic disk device 107 to the main memory 106 into consideration, for the case that the document storage area 141 storing documents to be searched exists in the magnetic disk device 107. As a result, an estimated time t2 for a text search can be calculated more precisely.

Figure 30:
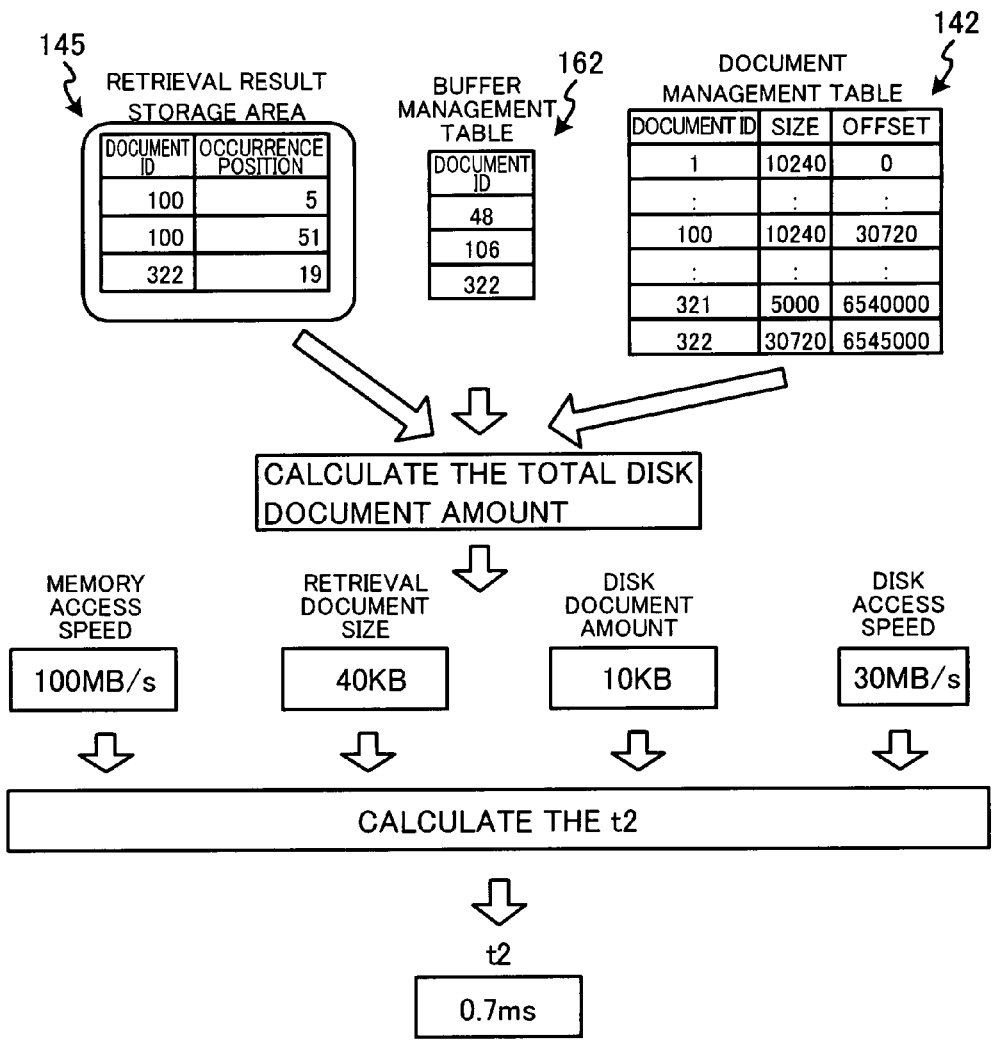
FIG. 30 specifically illustrates how a t2 is calculated in the embodiment wherein the document storage area 141 is provided in the magnetic disk device 107.

FIG. 30 specifically illustrates how a t2 is calculated in the case that the document storage area 141 is provided in the magnetic disk device 107. In the example shown in FIG. 30, similarly to the before-discussed example shown in FIG. 21, "教育 and ストリーミング and コミュニケーション and e‐ラーニング" has been provided as a retrieval criterion.

As shown in FIG. 30, the retrieval apparatus 100, in addition to calculating the retrieval document size, calculates as the disk document amount the total data amount of documents that have to be read out from the magnetic disk device 107 to the main memory 106, that is, the total of the sizes 1412 of the document management table 142 associated with the document IDs that are registered in the retrieval result storage area 145 but not in the buffer management table 162.

In the example shown in FIG. 30, the document IDs "100" and "322" are stored in the retrieval result storage area 145. Meanwhile, in the buffer management table 162, the document ID "322" is stored, but the document ID "100" is not. This means, the document associated with the document ID "100" is not cached in the document buffer 161. Therefore, the retrieval apparatus 100 obtains the size 1412 associated with the document ID "100" from the document management table 142, and then sets the obtained data size "10240" bytes to the disk document amount, which has to be read out from the magnetic disk device 107 to the main memory 106.

Then, as explained above, the retrieval apparatus 100 calculates the t2 by adding the quotient of dividing the retrieval document size by the memory access speed and the quotient of dividing the disk document amount by the disk access speed. In the example shown in FIG. 30, the t2 is calculated as "40 (KB)÷100 (MB/sec)+10 (KB)÷30 (MB/sec)=0.7 (ms)".

In some embodiments, the document storage area 141 may be provided in, for example, the CD-ROM 109, rather than the magnetic disk device 107. In this case, the setting information storage area 147 stores the data amount which can be read out from the CD-ROM 109 per unit time as a disk access speed.

==Third Variation: Retrieval-method-switching Decision Process==

In the retrieval apparatus 100 in the illustrative embodiment discussed above, each time a document retrieval is performed with regards to one character by the index scan method, a method switching decision process is performed to decide whether to continue the index search with regards to the rest of the characters or switch the retrieval method to the text scan method. However, the apparatus 100 may determine to perform or omit this switching decision process, depending on the number of the remaining target documents. In the following, a description is given with regards to the retrieval apparatus 100 according to the variation in which a process of deciding whether or not to switch a retrieval method is determined to be performed or omitted, depending on the number of the remaining target documents.

Figure 31:
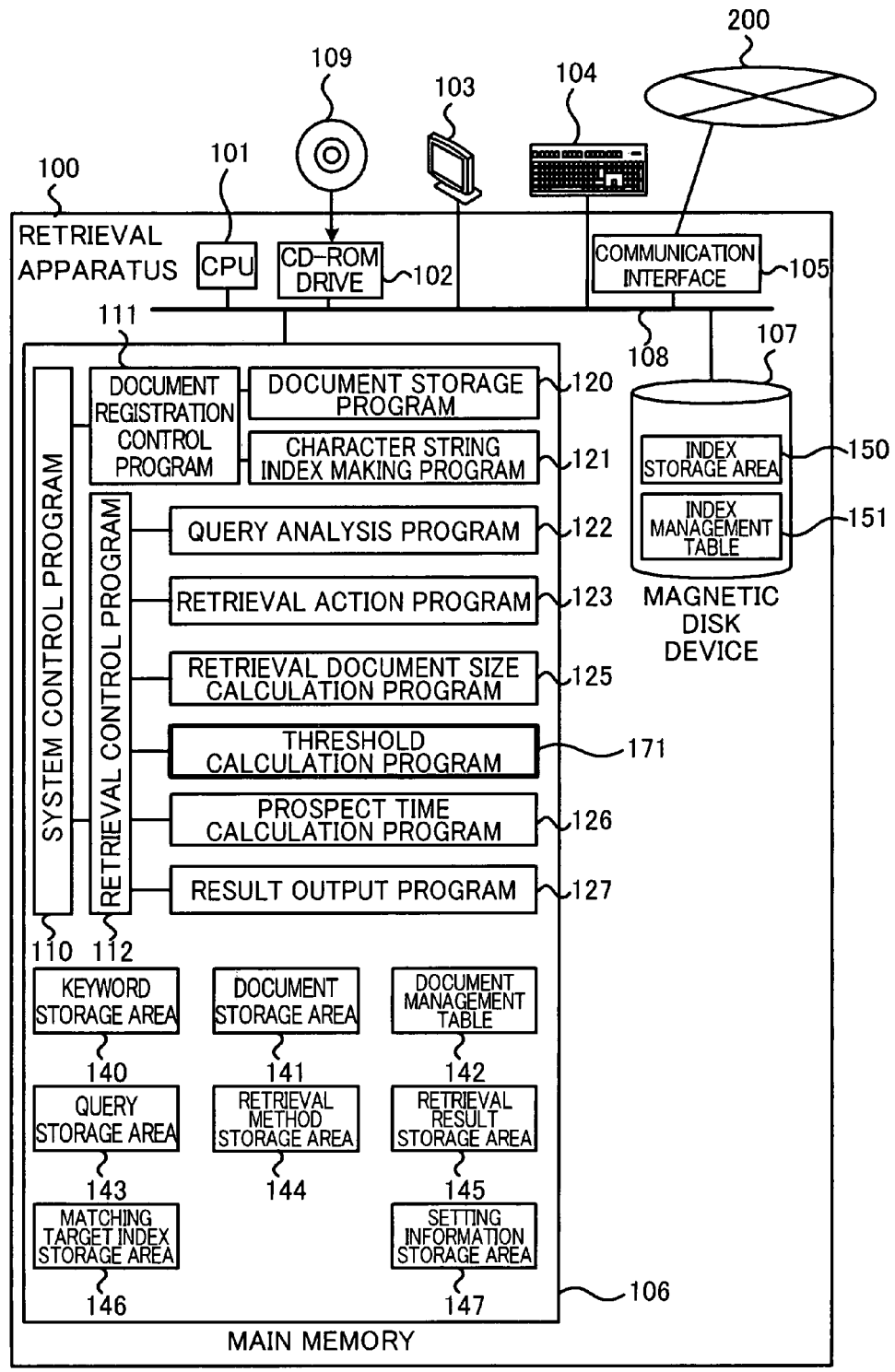
FIG. 31 shows an illustrative hardware structure of the retrieval apparatus 100 in an embodiment of determining whether to perform a retrieval-method-switching decision process, based on the number of target documents.
Figure 32:
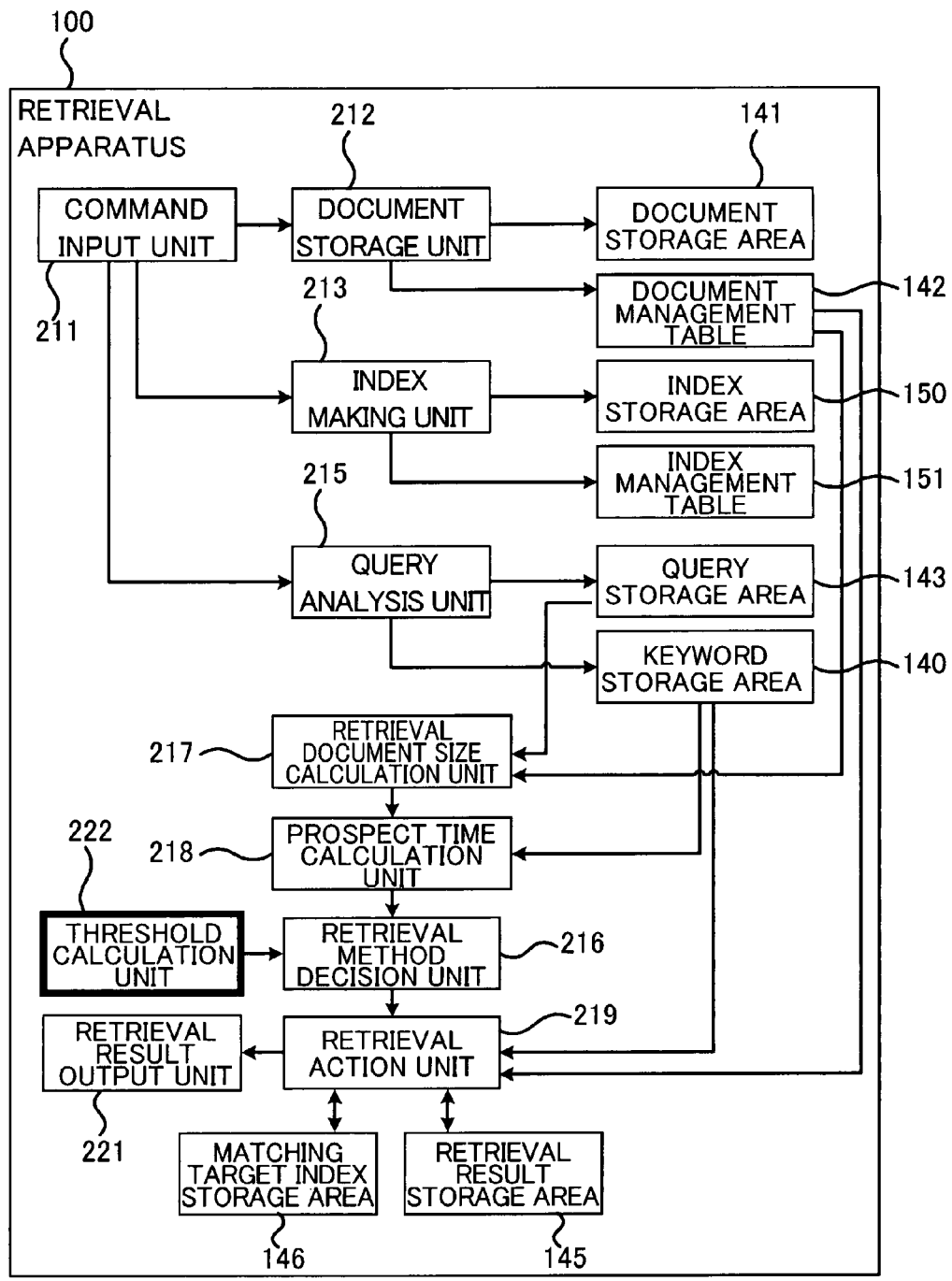
FIG. 32 shows an illustrative software structure of the retrieval apparatus 100 in the embodiment of determining whether to perform a retrieval-method-switching decision process, based on the number of target documents.

FIG. 31 shows an illustrative hardware structure of the retrieval apparatus 100 in this variation. As shown in FIG. 31, the retrieval apparatus 100 stores a threshold calculation program 171 in the main memory 106. FIG. 32 shows an illustrative software structure of the retrieval apparatus 100 in this variation. As shown in FIG. 32, the retrieval apparatus 100 includes a threshold calculation unit 222 for calculating a threshold of the number of target documents. The threshold calculation unit 222 is realized by the CPU 101 executing the threshold calculation program 171.

Figure 33:
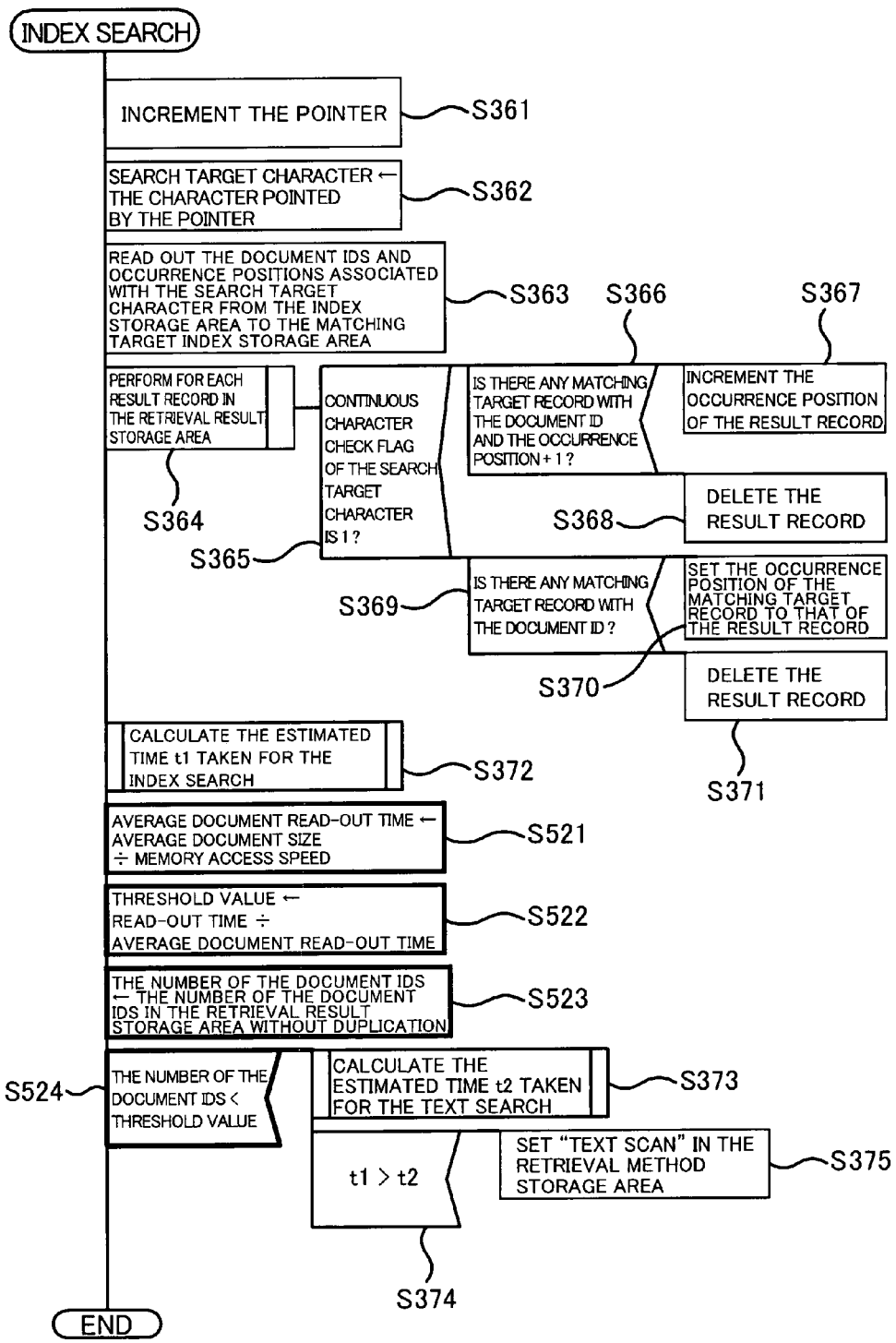
FIG. 33 is a PAD diagram illustrating a flow of the index search in the embodiment of determining whether to perform a retrieval-method-switching decision process, based on the number of target documents.

FIG. 33 is a PAD diagram illustrating a flow of an index search process according to this variation. The process shown in FIG. 33 is identical to the before-discussed process shown in FIG. 17, except the steps S521 to S524 are additionally included therein. It is assumed that the retrieval apparatus 100 calculates in advance an average of sizes 1412 (hereinafter referred to as "average size") using the document management table 142.

After calculating the t1 (S372), the retrieval apparatus 100 calculates the average time for reading out a document by dividing the average size of documents by the memory access speed (S521), and then obtains a threshold by dividing the read-out time calculated in the step S384 in FIG. 18 by the average document read-out time (S522). The retrieval apparatus 100 counts the number of the document IDs registered in the retrieval result storage area 145 without duplication (S523), and then, only if the counted number of the document IDs is less than the threshold (S524: True), goes through the steps S373 to S375.

In this way, when the number of the narrowed down target documents is equal to or greater than a given threshold, it is possible to continue the document retrieval by the index scan method without a process of deciding whether or not to switch the retrieval method. The threshold is determined based on an average data size of documents and an amount of remaining indices, so that it is possible to decide based on the threshold which time is longer, the time taken for the index search or the time taken for the text search, without a t2 calculation process, provided that target documents have about average data sizes. Thus, the time taken for a t2 calculation process can be omitted, and therefore the time taken for an entire document retrieval process can be reduced.

Figure 34:
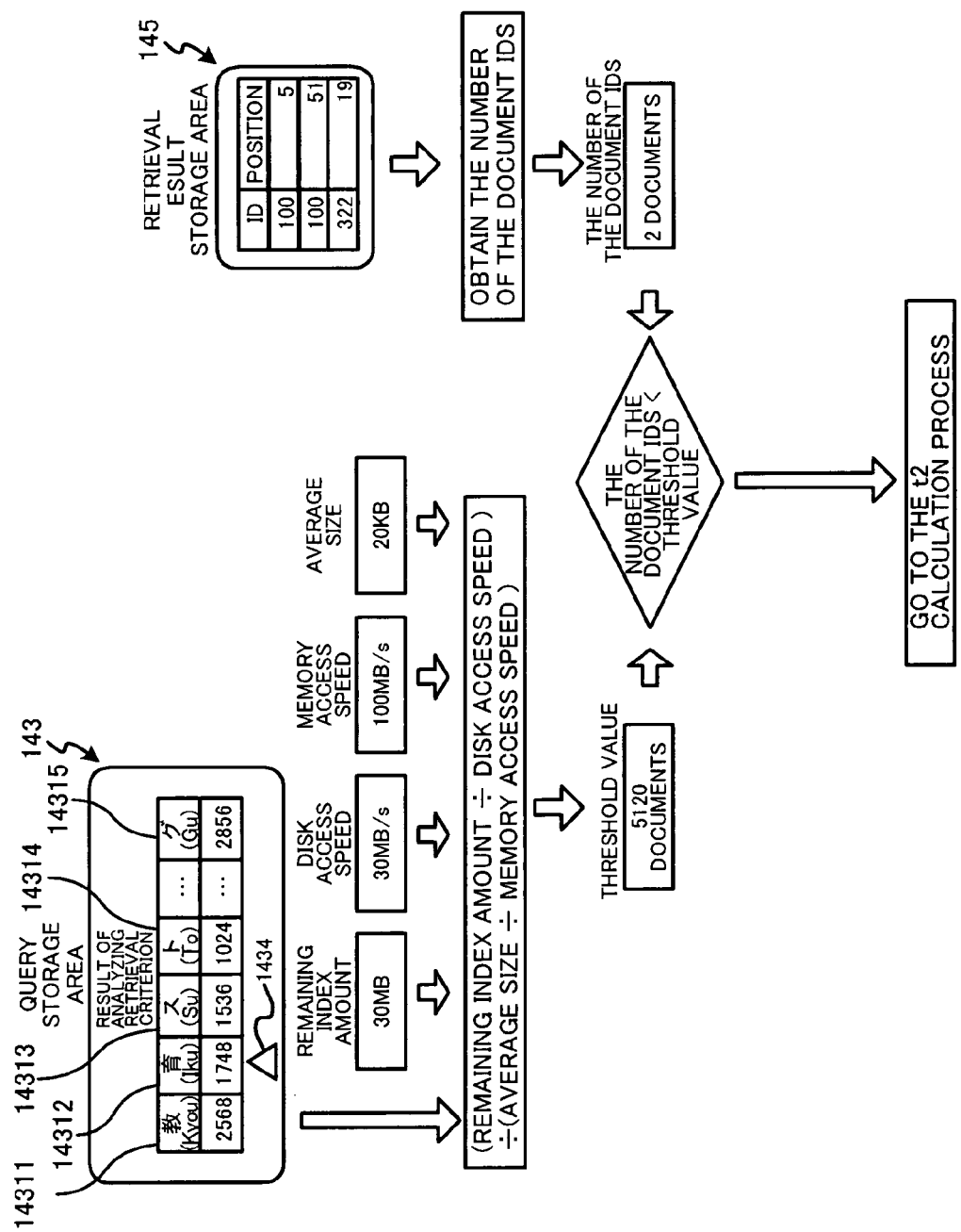
FIG. 34 specifically illustrates a process of determining using a threshold whether to perform the t2 calculation.

FIG. 34 specifically illustrates a process of determining whether or not to perform a t2 calculation using a threshold as mentioned above. In the example shown in FIG. 34, similarly to the before-discussed example shown in FIG. 21, "教育and ストリーミングand コミュニケーションand e‐ラーニング" has been provided as a retrieval criterion. In addition, the average document size, which is the average of the sizes 1412 of the document management table 142, has been obtained as "20 (KB)" in this example.

In the example shown in FIG. 34, the remaining index amount or the index amount of the characters 14314 "Su" to 14315 "Gu" is "30 (MB)", and the disk access speed is "30 (MB/sec)", and the memory access speed is "100 (MB/sec)", and the average document size is "20 (KB)". Therefore, the threshold is "30 (MB)÷30 (MB/sec)÷(20 (KB)÷100 (MB/sec))≈5120". The document IDs registered in the retrieval result storage area 145 without duplication are two IDs, "100" and "322". Thus, since "2<5120", determination is made so as to perform the steps (S373) to (S375), the step for calculating the t2 and the following steps.

In this variation, a threshold is obtained from a read-out time calculated based on a remaining index amount and the disk access speed, and an average document read-out time calculated based on an average document size and the memory access speed. However, a threshold may be stored in advance in the setting information storage area 147 as a fixed value.

==Fourth Variation: Weight Assignment==

Figure 35:
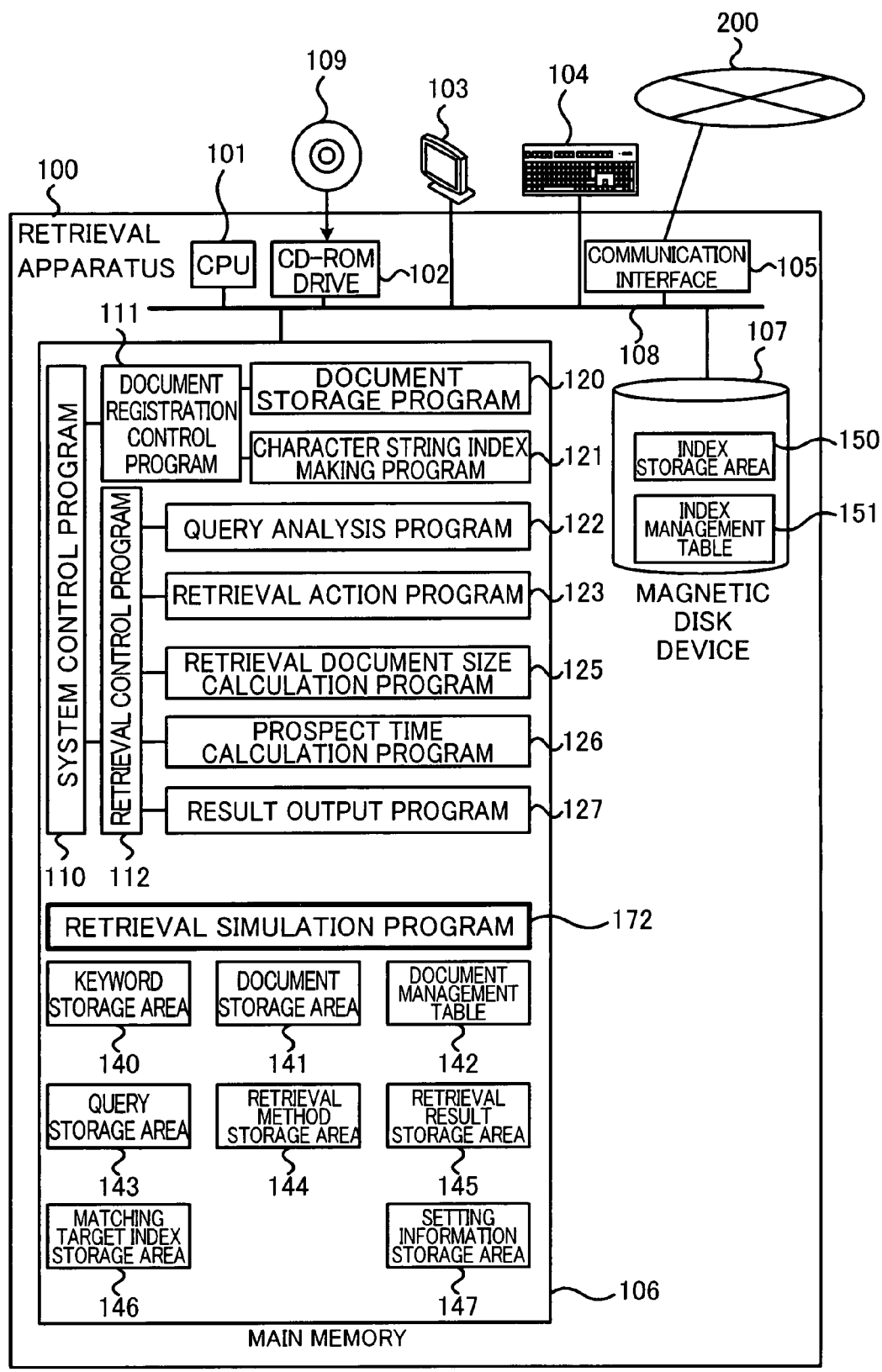
FIG. 35 shows an illustrative hardware structure of the retrieval apparatus 100 in an embodiment wherein a weight is assigned to a t1.
Figure 36:
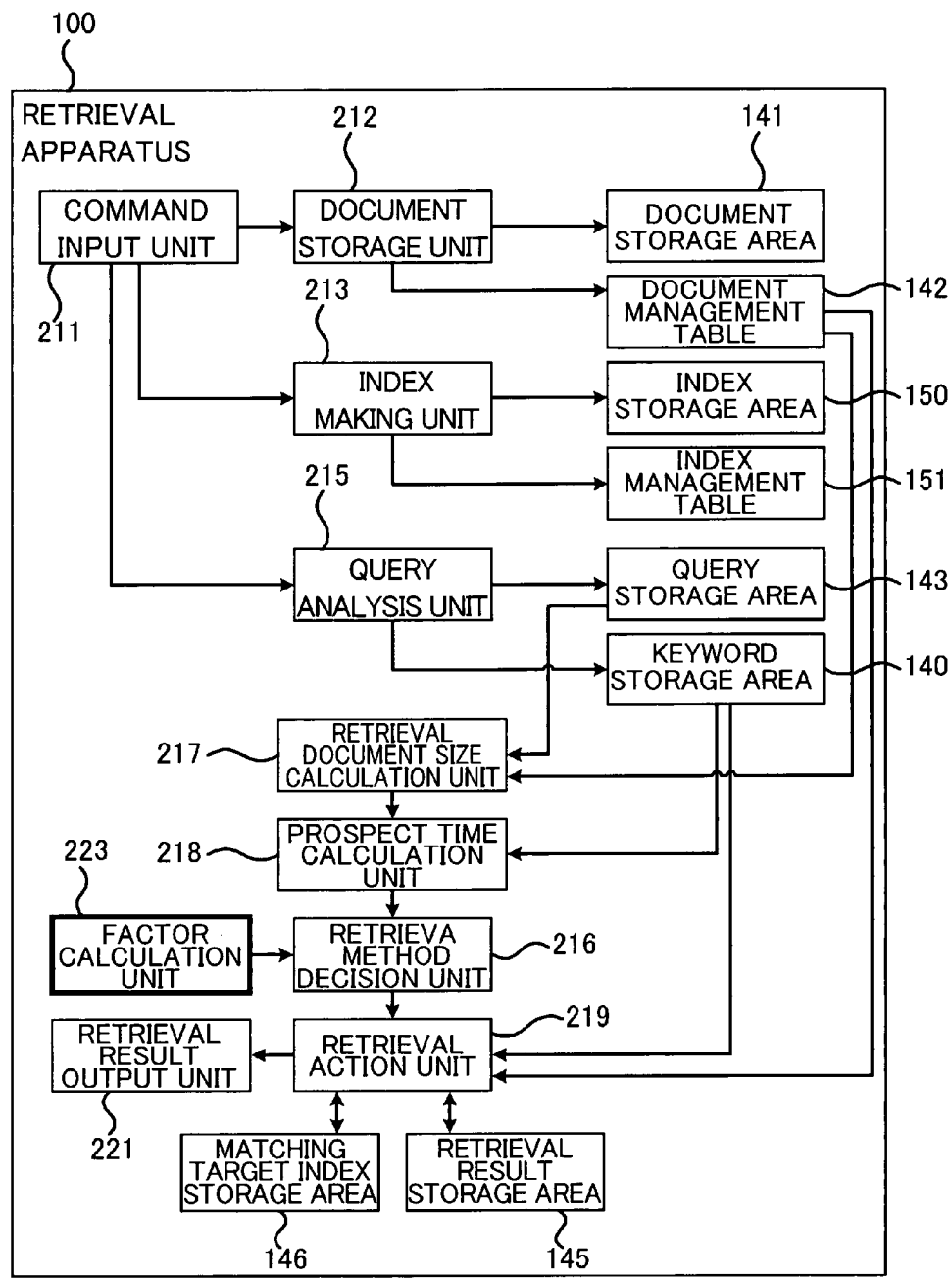
FIG. 36 shows an illustrative software structure of the retrieval apparatus 100 in the embodiment wherein a weight is assigned to a t1.

The retrieval apparatus 100 in the illustrative embodiment discussed above may be modified such that a weight is assigned to a t1 in a process of deciding whether to switch a retrieval method. FIG. 35 shows an illustrative hardware structure of the retrieval apparatus 100 according to this variation. As shown in FIG. 35, the retrieval apparatus 100 according to this variation stores a retrieval simulation program 172 in the main memory 106. Also, FIG. 36 shows an illustrative software structure of the retrieval apparatus 100 according to this variation. As shown in FIG. 36, the retrieval apparatus 100 according to this variation includes a factor calculation unit 223 for calculating a factor for assigning a weight to a t1. The factor calculation unit 223 is realized by the CPU 101 executing the retrieval simulation program 172.

Figure 37:
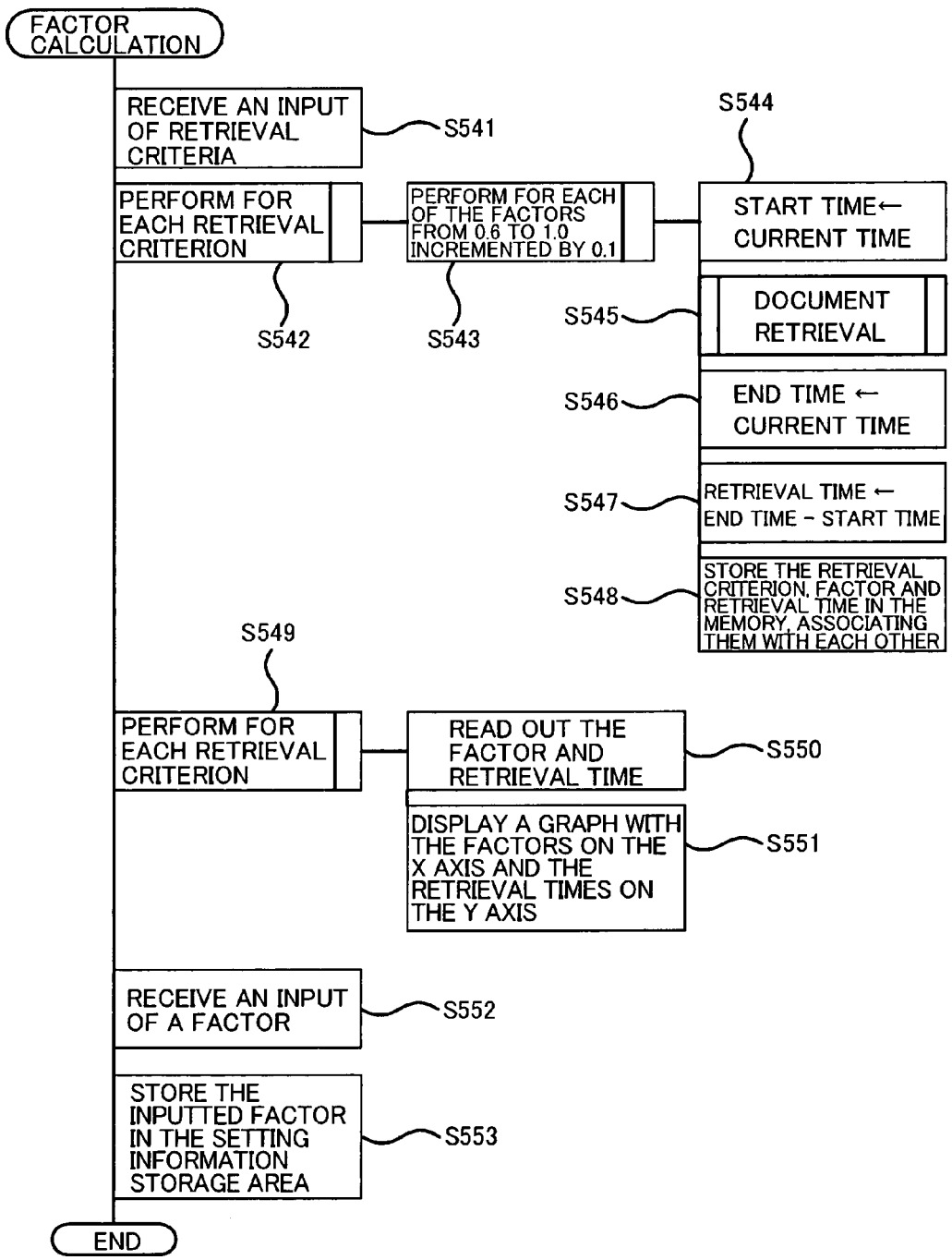
FIG. 37 is a PAD diagram illustrating a flow of a process of deciding a factor for assigning a weight to a t1.
Figure 38:
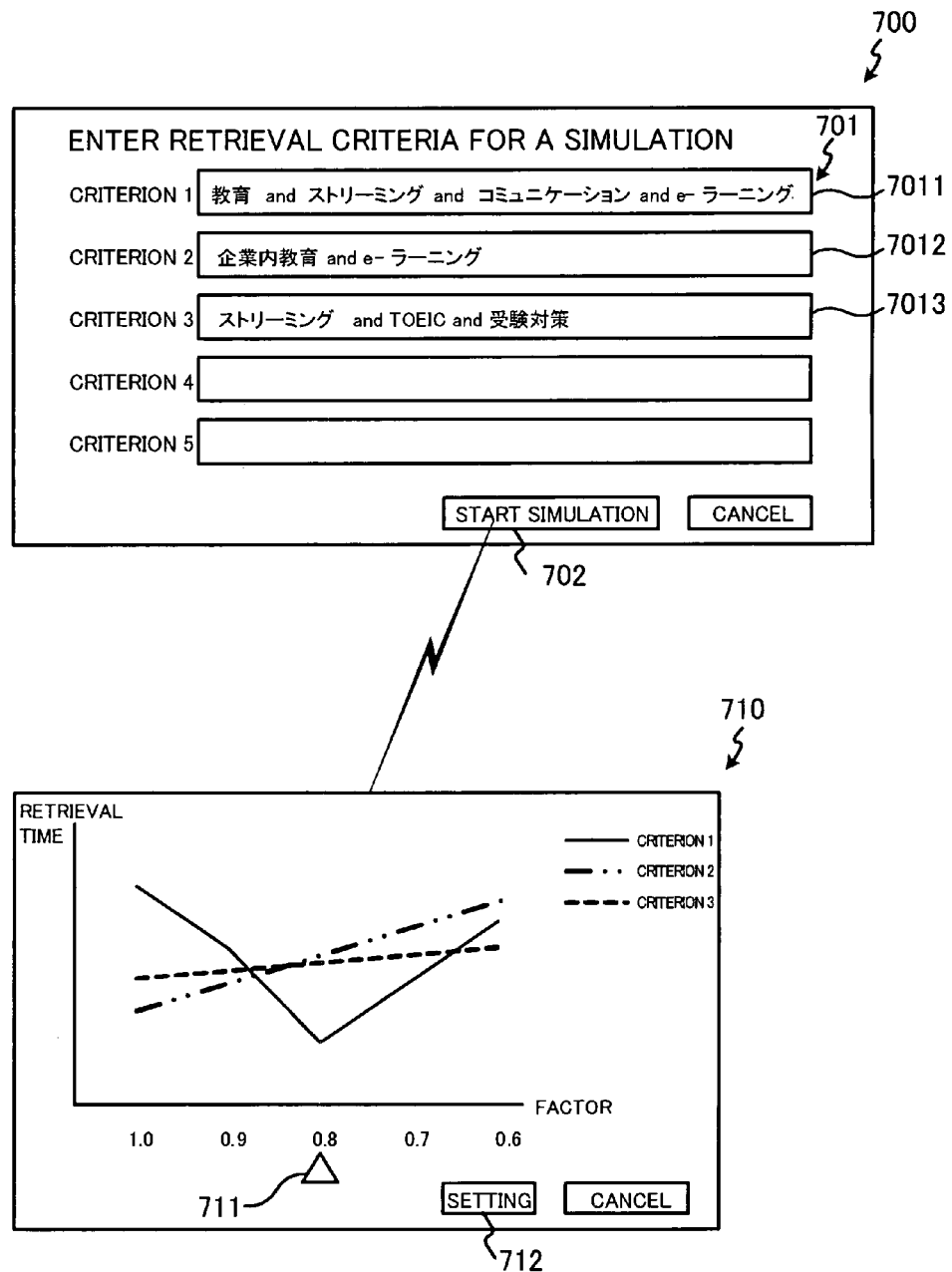
FIG. 38 shows an illustrative screen for receiving an input of retrieval criteria.

FIG. 37 shows a flow of a factor calculation process. The retrieval apparatus 100 receives an input of a plurality of retrieval criteria from a user (S541). FIG. 38 shows an illustrative screen for receiving an input of retrieval criteria. As shown in FIG. 38, on a screen 700, there are provided five entry fields 701 for entering retrieval criteria, allowing up to five retrieval criteria to be specified. In the example shown in FIG. 38, the three retrieval criteria, 7011 "教育and ストリーミングand コミュニケーションand e‐ラーニング", 7012 "企業内教育and e‐ラーニング", and 7013 "ストリーミングand ＴＯＥＩＣ and 受験対策" are entered in the entry fields 701. When one or more retrieval criteria are entered in the entry fields 701 and a Start Simulation button 702 is pressed, the retrieval apparatus 100 performs the following process for each of the entered retrieval criteria (S542).

The retrieval apparatus 100 performs the following process for each of the factors from "0.6" to "1.0" incremented by "0.1" (S543). The retrieval apparatus 100 sets the current time to a start time (S544), and performs the before-discussed document retrieval process shown in FIG. 15, with regards to the retrieval criterion that is currently processed (S545).

Figure 39:
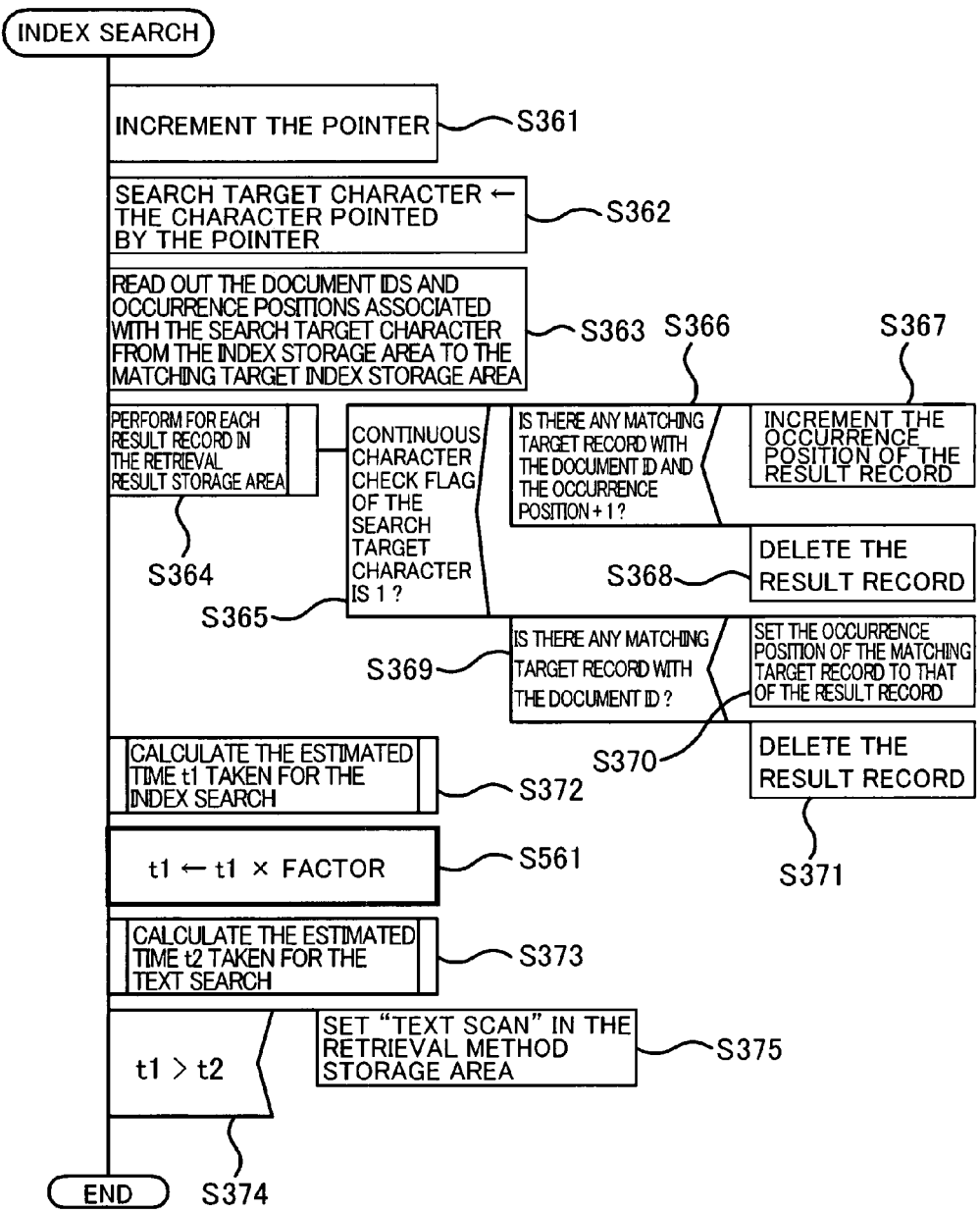
FIG. 39 is a PAD diagram illustrating a flow of the index search in the case that a t1 is multiplied by a factor before being compared to a t2.

Here it should be noted that, in an index search in this variation, a t1 is multiplied by the above-mentioned factor before being compared to a t2. FIG. 39 illustrates a flow of an index search in this case. An index search in this case is identical to the before-discussed index search shown in FIG. 17, except that the step S561, in which a t1 is multiplied by a factor, is additionally included therein.

Referring back to FIG. 37, upon completing the retrieval process, the retrieval apparatus 100 sets the current time to an end time (S546), and sets the time elapsed from the start time until the end time to a retrieval time which is the time taken for the retrieval process (S547). The retrieval apparatus 100 stores the retrieval criterion, the factor, and the retrieval time in the main memory 106 such that these items are associated with each other (S548).

After completing the above process for each of all combinations of the entered retrieval criteria and the factors from 0.6 to 1.0, the retrieval apparatus 100 reads out, for each retrieval criterion (S549), the associated factors and retrieval times from the main memory 106 (S550), and then displays a graph with the factors on the x-axis and the retrieval times on the y-axis (S551).

FIG. 38 shows an illustrative screen 710 displaying the graph with regards to the before-listed three retrieval criteria. Further, below this graph, there is displayed a slider 711 pointing to one of the factors, and a user can specify one of the factors by moving the slider 711. When a Setting button 712 on the screen 710 is pressed, the retrieval apparatus 100 receives the input of the factor pointed by the slider 711 (S552), and stores the received factor in the setting information storage area 147 (S553).

When performing an index search thereafter, in the above-mentioned step S561 shown in FIG. 39, the retrieval apparatus 100 uses the factor stored in the setting information storage area 147.

In this way, it is possible to assign a weight to a t1, which is used in deciding whether or not to switch a retrieval method. Thus, a user can further speed up a document retrieval process by adjusting a factor according to need, taking execution times for retrieval processes into consideration.

In this variation, a factor is specified by a user. However, not limited to this, a factor may be also decided by the retrieval apparatus 100. In this case, the retrieval apparatus 100 reads out, for each factor, the associated retrieval times from the main memory 106, and calculates the average of the read out retrieval times, and stores in the setting information storage area 147 the factor whose average calculated is the least. This allows an adjustment for optimizing a retrieval process to be automatically made by the retrieval apparatus 100

Further, in this variation, retrieval criteria are directly entered on the screen 700. However, retrieval criteria may be written in a file or the like in advance, and the retrieval apparatus 100 may read out the written retrieval criteria from that file.

Further, on the screen 710 discussed above, changes in factor and retrieval time is diagrammatized with a line graph. However, they may be showed using any type of graph, or may be expressed numerically using, for example, a table format.

Figure 40:
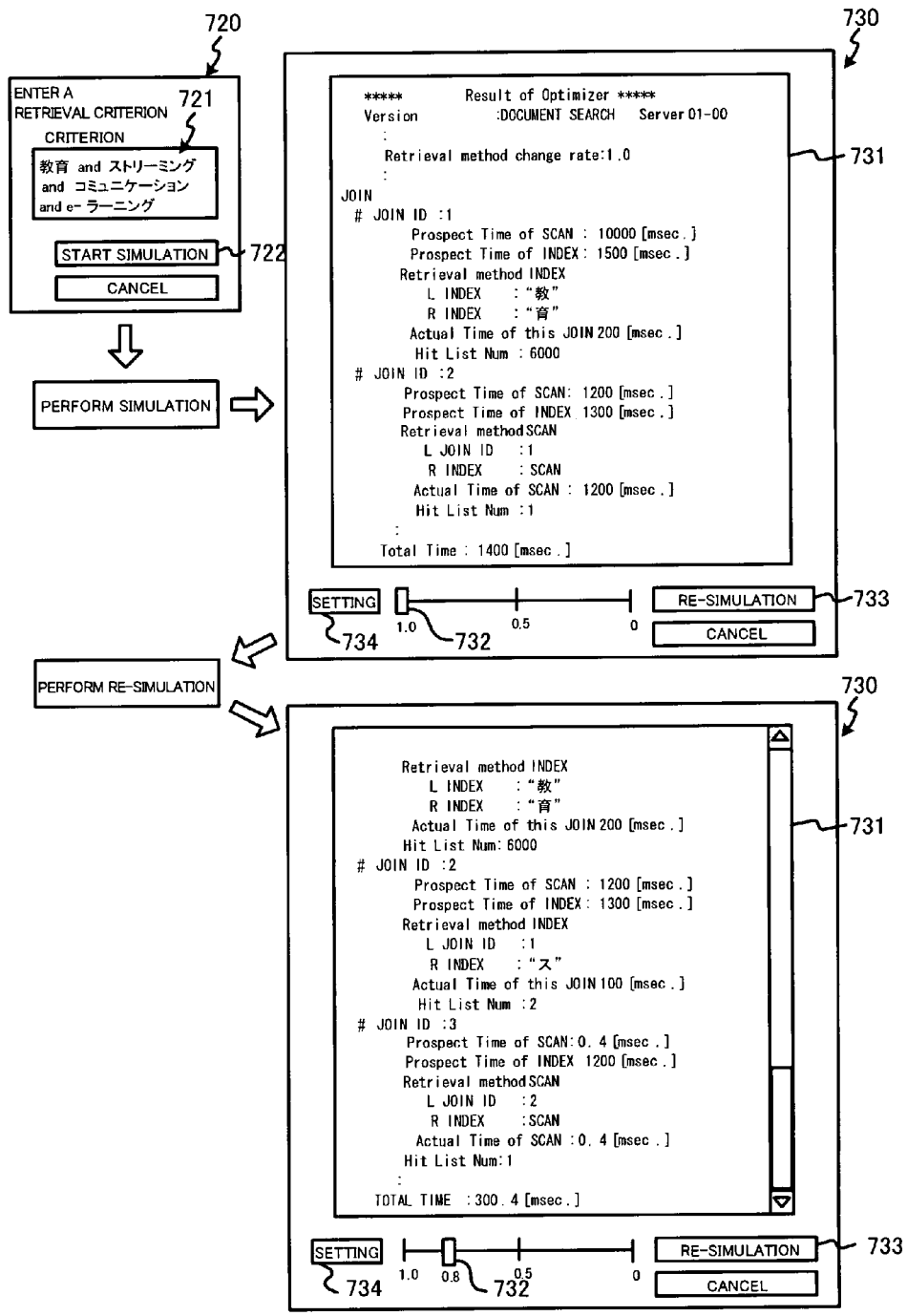
FIG. 40 shows an illustrative screen used in the case that the retrieval process is performed using a factor specified by a user.

Furthermore, in this variation, retrieval processes with regards to a plurality of retrieval criteria are performed using a plurality of factors, and then a graph of retrieval times relative to the combinations of retrieval criterion and factor is displayed. However, a retrieval process may be performed with regards to one retrieval criterion using a factor specified by a user. FIG. 40 shows an illustrative screen for use in this case.

In the example shown in FIG. 40, the retrieval criterion "教育 and ストリーミング and コミュニケーション and e‐ラーニング" is entered in a retrieval criterion entry field 721 on a screen 720. When a Start Simulation button 722 on the screen 720 is pressed, the retrieval apparatus 100 performs a document retrieval process including the above-discussed index search shown in FIG. 39 using the factor "1.0", and then displays a screen 730 for showing the retrieval time.

The screen 730 includes a display field 731 for outputting a retrieval time and various statistical information regarding a retrieval process. In the example shown in FIG. 40, the display field 731 shows that, the searches "JOIN ID 1" and "JOIN ID 2", two searches in total, are carried out, and one of them, the search indicated as "JOIN ID 1", is performed by the index search, while the other, the search indicated as "JOIN ID 2", is performed by the text search.

In addition, regarding the search "JOIN ID 1", the display field 731 first shows that the estimated times t2 taken for the text search and t1 taken for the index search are "1000 (milliseconds)" and "1500 (milliseconds)", respectively. The display field 731 then shows that the time actually taken for index checking with regards to the characters 7311 "Kyou" and "Iku" is "200" milliseconds, and the number of the documents retrieved from this index search is "6000".

Moreover, the screen 730 includes a slider 732 for setting a factor, the slider 732 situated below the display field 731. A user can specify a factor by moving the slider 732. When a user presses a Re-simulation button 733 after specifying a factor by moving the slider 732, the retrieval apparatus 100 performs the above-discussed retrieval process using the factor pointed by the slider 732. FIG. 40 also shows an example of the screen 730 displayed after the slider 732 is moved to point to the factor 0.8 and then the Re-simulation button 733 is pressed.

Here, the display field 731 shows that, with the factor "0.8" specified, in the search "JOIN ID 2", the estimated times t2 taken for the text search and t1 taken for the index search are "1200 (milliseconds)" and "1300 (milliseconds)", respectively. In this case, since the t2 is greater than "1040 (milliseconds)" which is the t1 multiplied by 0.8, the retrieval process is continued still using the index scan method as the retrieval method, as displayed in the field 731.

On the other hand, as displayed in the field 731, in the search "JOIN ID 3", the estimated time t2 becomes "0.4 (millisecond)" and the estimated time t1 becomes "1200 (milliseconds)". Thus, since "1200*0.8=960 (milliseconds)" and therefore the estimated time t1 becomes greater than the estimated time t2, the retrieval method is switched to the text search, as displayed in the field 731.

When a user presses a Setting button 734 after specifying a factor by moving the slider 732, the retrieval apparatus 100 stores the factor pointed by the slider 732 in the setting information storage area 147. When performing an index search thereafter, in the before-discussed step S561 shown in FIG. 39, the retrieval apparatus 100 uses the factor stored in the setting information storage area 147.

In this way, a user can repeat a retrieval process with regards to a specified retrieval criterion, changing a factor. This allows a user to tune the retrieval apparatus 100, adjusting a factor so as to further reduce a retrieval time.

In this variation, it is a t1 that is multiplied by a factor before a t1-t2 comparison. However, a t2 may be multiplied by a factor, or two factors may be received and a t1 and a t2 may be respectively multiplied by them.

==Other Variations==

In the illustrative embodiment discussed above, the index storage area 150 is reserved in the magnetic disk device 107. However, the area 150 may be reserved in the main memory 106 in some embodiments. In this case, in the step S384 in the before-discussed process of calculating the estimated time t1 taken for the index search as shown in FIG. 18, the read-out time is calculated by dividing the remaining index amount by the memory access speed. Index information stored in the main memory 106 can be read out faster than that stored in the magnetic disk device 107, so that it is possible to further speed up the index search.

In the illustrative embodiment discussed above, indices are created by the 1-gram method. Not limited to this, indices may be created by any N-gram method such as 2-gram, 3-gram and so on. Index information may be stored in the order of character codes. Index information may be stored in a hash format, or may be stored in a Balanced tree structure. In some embodiments, rather than using the N-gram method, index information may be created based on a morpheme included in a document. In other embodiments, indices may be created on the word basis.

In the illustrative embodiment discussed above, for brevity of description, an AND operator retrieval is performed with regards to keywords extracted from a retrieval command. However, a criterion including the OR operator may be used as well. In this case, for each of two keyword groups connected by the OR operator, a retrieval process as mentioned above may be performed, and then the document ID lists created by the respective processes may be joined together.

In the illustrative embodiment discussed above, the memory access speed and the disk access speed are stored in the setting information storage area 147. In some embodiments, they may be written in the programs, or may be obtained by measuring the times taken for reading out data from the main memory 106 and from the magnetic disk device 107. In other embodiments, they may be provided as arguments of a retrieval command.

In the illustrative embodiment discussed above, in an index search, the retrieval apparatus 100 first reads out the document IDs and the occurrence positions to the matching target index storage area 146, and then determines whether a record with a document ID matching the document ID of the result record is stored in the matching target index storage area 146

(S366 and S369). In some embodiments, the retrieval apparatus 100 may search the index storage area 150 for index information with the current search target character and the matching document ID.

In the illustrative embodiment discussed above, when analyzing a retrieval criterion or in the step S348 shown in FIG. 15, index sizes of characters are stored in the query storage area 143. In some embodiments, index sizes thereof may be obtained from the index management table 151 during an index search, for example, in a t1 calculation process (S383) shown in FIG. 18.

In the illustrative embodiment discussed above, the document management table 142 is created in a document registration process. In some embodiments, the table 142 may be created during a document retrieval process. For example, immediately before the step S373 of FIG. 17 in the case of first performing an index search, the document data sizes of the document IDs stored in the retrieval result storage area 145 may be obtained from the document storage area 141, and the obtained data sizes may be registered in the document management table 142 such that they are associated with the document IDs. In other embodiments, the process of creating the document management table 142 may be performed concurrently with an index search.

In some embodiments, the offset 1413 of the document management table 142 may be replaced with the address in the main memory 106 where a document is stored. In this case, the retrieval apparatus 100 can obtain an address required to access a document from the document management table 142, so that it becomes possible to perform an address resolution therefor faster, allowing a time taken for reading out a document to be shortened.

What is claimed is:

1. A document retrieval apparatus comprising:
   a document storage unit for storing a document to be searched;
   a document size storage unit for storing a data size of the document such that the data size is associated with a document ID for identifying the document;
   a retrieval document size calculation unit for reading out from the document size storage unit the data size associated with the document ID indicating the document to be searched, and calculating a retrieval document size by adding up the read out data size(s);
   a prospect time calculation unit for calculating a first estimated time taken for a retrieval process by a first retrieval method and a second estimated time taken for the retrieval process by a second retrieval method, based on the retrieval document size;
   a retrieval method decision unit for comparing the first and second estimated times and deciding which retrieval method to use for performing the retrieval process, the first method or the second method;
   a retrieval key input unit for receiving an input of a first and second retrieval keys;
   an index storage unit for storing the retrieval key contained in the document and the document ID such that they are associated with each other;
   a retrieval action unit for performing a process of retrieving the document containing the retrieval key; and
   a retrieved document ID storage unit for storing a retrieved document ID indicating the document containing the retrieval key, and
   wherein the first retrieval method is an index scan method of retrieving the document ID associated with the retrieval key from the index storage unit;
   the second retrieval method is a text scan method of searching, for each of the documents stored in the document storage unit, whether or not the retrieval key is contained in the document;
   the retrieval action unit retrieves the document containing the first retrieval key in accordance with the first retrieval method, and stores in the retrieved document ID storage unit the retrieved document ID indicating the document containing the first retrieval key;
   the retrieval document size calculation unit reads out from the document size storage unit the data size associated with each of the retrieved document IDs stored in the retrieved document ID storage unit, and calculates the retrieval document size by adding up the read out data sizes; and
   the retrieval method decision unit compares the first and second estimated times and decides which retrieval method to use for performing the process of retrieving the document data containing the second retrieval key, the first method or the second method.

2. The document retrieval apparatus according to claim 1, wherein:
   the retrieval method decision unit determines whether or not to perform a process of deciding the retrieval method used for retrieving the document data, depending on whether or not the number of the retrieved document IDs is equal to or less than a predetermined number; and
   the retrieval method decision unit, if determining to perform the process of deciding the retrieval method, then compares the first and second estimated times, and decides which retrieval method to use for performing the process of retrieving the document containing the second retrieval key, the first method or the second method, or
   the retrieval method decision unit, if determining not to perform the process of deciding the retrieval method, then decides to perform the process of retrieving the document data containing the second retrieval key in accordance with the first method.

3. The document retrieval apparatus according to claim 1, wherein:
   the index storage unit stores index information in which the retrieval key and the document ID are associated with each other;
   the document retrieval apparatus further comprises
      an index size storage unit for storing an index size that is total amount of data sizes of all of the index information related to the retrieval key, such that the index size is associated with the retrieval key, and
      a setting information storage unit for storing a document read-out amount per unit time, which is the data amount that can be read out from the document storage unit per the unit time, and an index read-out amount per unit time, which is the data amount that can be read out from the index storage unit per the unit time;
   the prospect time calculation unit calculates as the second estimated time a time required for reading out all of the documents associated with the retrieved document IDs from the document storage unit, based on the retrieval document size and the document read-out amount per unit time; and
   the prospect time calculation unit reads out the index size associated with the second retrieval key from the index size storage unit, and calculates as the first estimated time a time required for reading out all of the index information related to the retrieval key from the index storage unit, based on the read out index size and the index read-out amount per unit time.

4. The document retrieval apparatus according to claim 3, wherein:

the setting information storage unit stores an average data size that is an average of the data sizes of the documents, in addition to the document read-out amount per unit time and the index read-out amount per unit time;

the retrieval apparatus further comprises a threshold calculation unit for calculating a threshold used for determining whether or not to perform the process of deciding the retrieval method, based on the average data size, the document read-out amount per unit time, and the index read-out amount per unit time; and the retrieval method decision unit, if the number of the retrieved document IDs is equal to or less than the threshold, then performs the process of deciding which retrieval method to use for performing the process of retrieving the document data containing the second retrieval key, the first method or the second method, or the retrieval method decision unit, if the number of the retrieved document IDs is greater than the threshold, then decides to perform the process of retrieving the document data containing the second retrieval key in accordance with the first retrieval method.

5. The document retrieval apparatus according to claim 1, wherein:

the retrieval method decision unit decides the retrieval method used for performing the process of retrieving the document containing the second retrieval key, by comparing a time resulting from multiplying the first estimated time by a predetermined factor and the second estimated time.

6. The document retrieval apparatus according to claim 1, wherein:

the retrieval key comprises a combination of a predetermined number of characters; and the index storage unit stores the document IDs, associating them with all of the combinations of the predetermined number of the characters contained in all of the documents to be searched.

7. A document retrieval method executed by a computer which comprises a document storage unit for storing a document to be searched, the method comprising:

storing in a memory a data size of the document such that the data size is associated with a document ID for identifying the document, reading out from the memory the data size associated with the document ID indicating the document to be searched, and calculating a retrieval document size by adding up the read out data size(s), calculating a first estimated time taken for a retrieval process in accordance with a first retrieval method and a second estimated time taken for the retrieval process in accordance with a second retrieval method, based on the retrieval document size, and comparing the first and second estimated times, and deciding which retrieval method to use for performing the retrieval process, the first method or the second method, wherein the computer comprises an index storage unit for storing a retrieval key and the document ID indicating the document containing the retrieval key such that they are associated with each other;

the first retrieval method is an index scan method of retrieving the document ID associated with the retrieval key from the index storage unit; and the second retrieval method is a text scan method of searching, for each of the documents stored in the document storage unit, whether or not the retrieval key is contained in the document, and the document retrieval method further comprising receiving an input of first and second retrieval keys, retrieving the document containing the first retrieval key in accordance with the first retrieval method, storing in the memory the document ID indicating the retrieved document containing the first retrieval key, reading out from the memory the data size associated with each of the retrieved document IDs stored in the memory, calculating the retrieval document size by adding up the read out data sizes, and comparing the first and second estimated times, and deciding which retrieval method to use for performing the process of retrieving the document containing the second retrieval key, the first retrieval method or the second retrieval method.

8. The document retrieval method according to claim 7, further comprising:

the computer determining whether or not to perform a process of deciding the retrieval method used for retrieving the document, depending on whether or not the number of the retrieved document IDs is equal to or less than a predetermined number, and if determining to perform the process of deciding the retrieval method, then comparing the first and second estimated times, and deciding which retrieval method to use for performing the process of retrieving the document containing the second retrieval key, the first retrieval method or the second retrieval method, or if determining not to perform the process of deciding the retrieval method, then deciding to perform the process of retrieving the document containing the second retrieval key in accordance with the first retrieval method.

9. The document retrieval method according to claim 7, wherein:

the index storage unit stores index information in which the retrieval key and the document ID are associated with each other, and the document retrieval method further comprising storing in the memory an index size that is the total amount of data sizes of all of the index information related to the retrieval key, such that the index size is associated with the retrieval key, storing in the memory a document read-out amount per unit time, which is the data amount that can be read out from the document storage unit per the unit time, and an index read-out amount per unit time, which is the data amount that can be read out from the index storage unit per the unit time, calculating as the second estimated time a time required for reading out all of the documents associated with the retrieved document IDs from the document storage unit, based on the retrieval document size and the document read-out amount per unit time, and reading out the index size associated with the second retrieval key from the index size storage unit, and calculating as the first estimated time a time required for reading out all of the indices related to the retrieval key from the index storage unit, based on the read out index size and the index read-out amount per unit time.

10. The document retrieval method according to claim 9, further comprising:
- the computer storing in the memory an average data size that is an average of the data sizes of the documents, in addition to the document read-out amount per unit time and the index read-out amount per unit time,
- calculating a threshold used for determining whether or not to perform the process of deciding the retrieval method, based on the average data size, the document read-out amount per unit time, and the index read-out amount per unit time, and
- if the number of the retrieved document IDs is equal to or less than the threshold, then performing the process of deciding which retrieval method to use for performing the process of retrieving the document containing the second retrieval key, the first retrieval method or the second retrieval method, or
- if the number of the retrieved document IDs is greater than the threshold, then deciding to perform the process of retrieving the document containing the second retrieval key in accordance with the first retrieval method.

11. The document retrieval method according to claim 7, wherein the computer decides the retrieval method used for performing the process of retrieving the document containing the second retrieval key, by comparing a time resulting from multiplying the first estimated time by a predetermined factor and the second estimated time.

12. The document retrieval method according to claim 7, wherein:
- the retrieval key comprises a combination of a predetermined number of characters; and
- the computer stores in the index storage unit the document IDs, associating them with all of the combinations of the predetermined number of the characters contained in all of the documents to be searched.

* * * * *